US011106587B2

(12) United States Patent
Tsirkin

(10) Patent No.: US 11,106,587 B2
(45) Date of Patent: Aug. 31, 2021

(54) MEMORY CACHE-LINE BOUNCE REDUCTION FOR SHARED I/O RING STRUCTURES

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 38 days.

(21) Appl. No.: 16/444,629

(22) Filed: Jun. 18, 2019

(65) Prior Publication Data

US 2020/0401520 A1 Dec. 24, 2020

(51) Int. Cl.
*G06F 12/084* (2016.01)

(52) U.S. Cl.
CPC .... *G06F 12/084* (2013.01); *G06F 2212/1008* (2013.01); *G06F 2212/608* (2013.01)

(58) Field of Classification Search
CPC .... G06F 12/084; G06F 2212/608; G06F 5/06; G06F 9/5061; G06F 2212/1008; G06F 2212/1024; G06F 2212/152
USPC ........................................................ 711/130
See application file for complete search history.

(56) References Cited

U.S. PATENT DOCUMENTS

| | | | |
|---|---|---|---|
| 7,185,147 B2 | 2/2007 | Illikkal | |
| 9,996,484 B1* | 6/2018 | Davis | ............... G06F 13/105 |
| 2005/0132144 A1* | 6/2005 | Illikkal | ............... G06F 12/0835 |
| | | | 711/145 |
| 2019/0370049 A1* | 12/2019 | Gopalan | ............ G06F 9/45558 |

OTHER PUBLICATIONS

Giacomoni, John; Moseley, Tipp; and Vachharajani, Manish, "FastForward for Efficient Pipeline Parallelism ; CU-CS-1028-07"; Apr. 1, 2007; Computer Science Technical Reports. 961; https://scholarcolorado.edu/csci_techreports/961; Boulder, Colorodo; (12 Pages).

OASIS; Virtual I/O Dev ice (VIRTIO) Version 1.0. Edited by Rusty Russell, Michael S. Tsirkin, Cornelia Huck, and Pawel Moll. Mar. 3, 2016. OASIS Committee Specification 04. http://docs.oasis-open.org/virtio/virtio/v1.0/cs04/virtio-v1.0-cs04.html.; Latest version: http://docs.oasis-open.org/virtio/virtio/v1.0/virtio-v1.0.html; (85 Pages).

* cited by examiner

*Primary Examiner* — David Yi
*Assistant Examiner* — Zubair Ahmed
(74) *Attorney, Agent, or Firm* — K&L Gates LLP

(57) ABSTRACT

A system includes a memory, a producer processor and a consumer processor. The memory includes a shared ring buffer, which has a partially overlapping active ring and processed ring. The producer processor is in communication with the memory and is configured to receive a request associated with a memory entry, store the request in a first slot of the shared ring buffer at a first offset, receive another request associated with another memory entry, and store the other request in a second slot (in the overlapping region adjacent to the first slot) of the shared ring buffer. The consumer processor is in communication with the memory and is configured to process the request and write the processed request in a third slot (outside of the overlapping region at a second offset and in a different cache-line than the second slot) of the shared ring buffer.

20 Claims, 13 Drawing Sheets

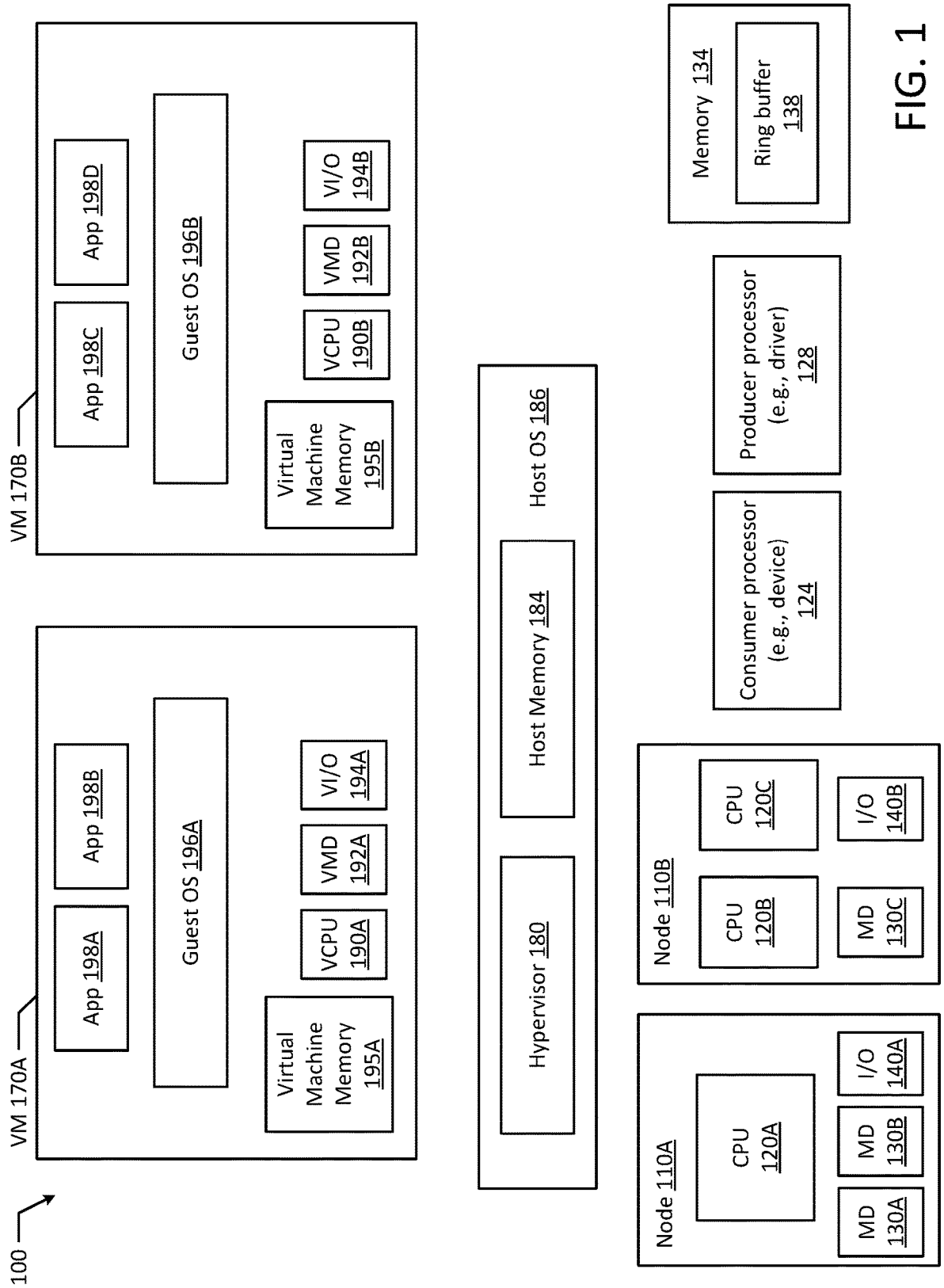

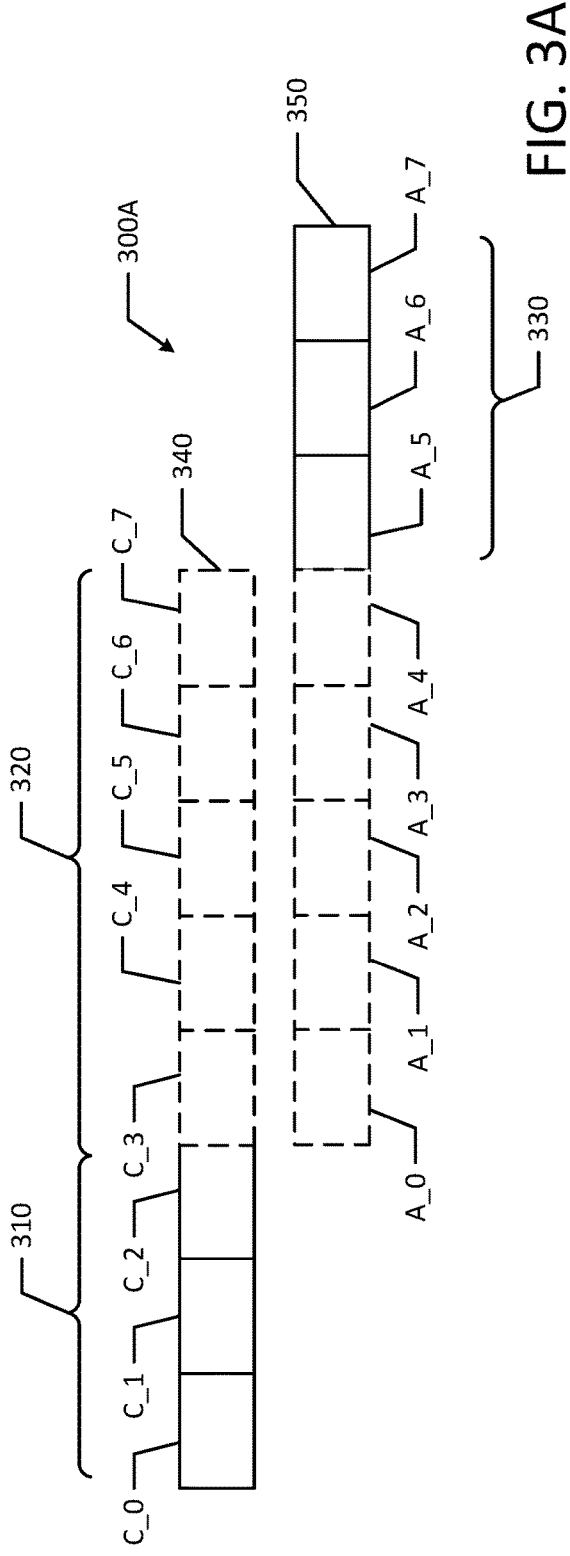

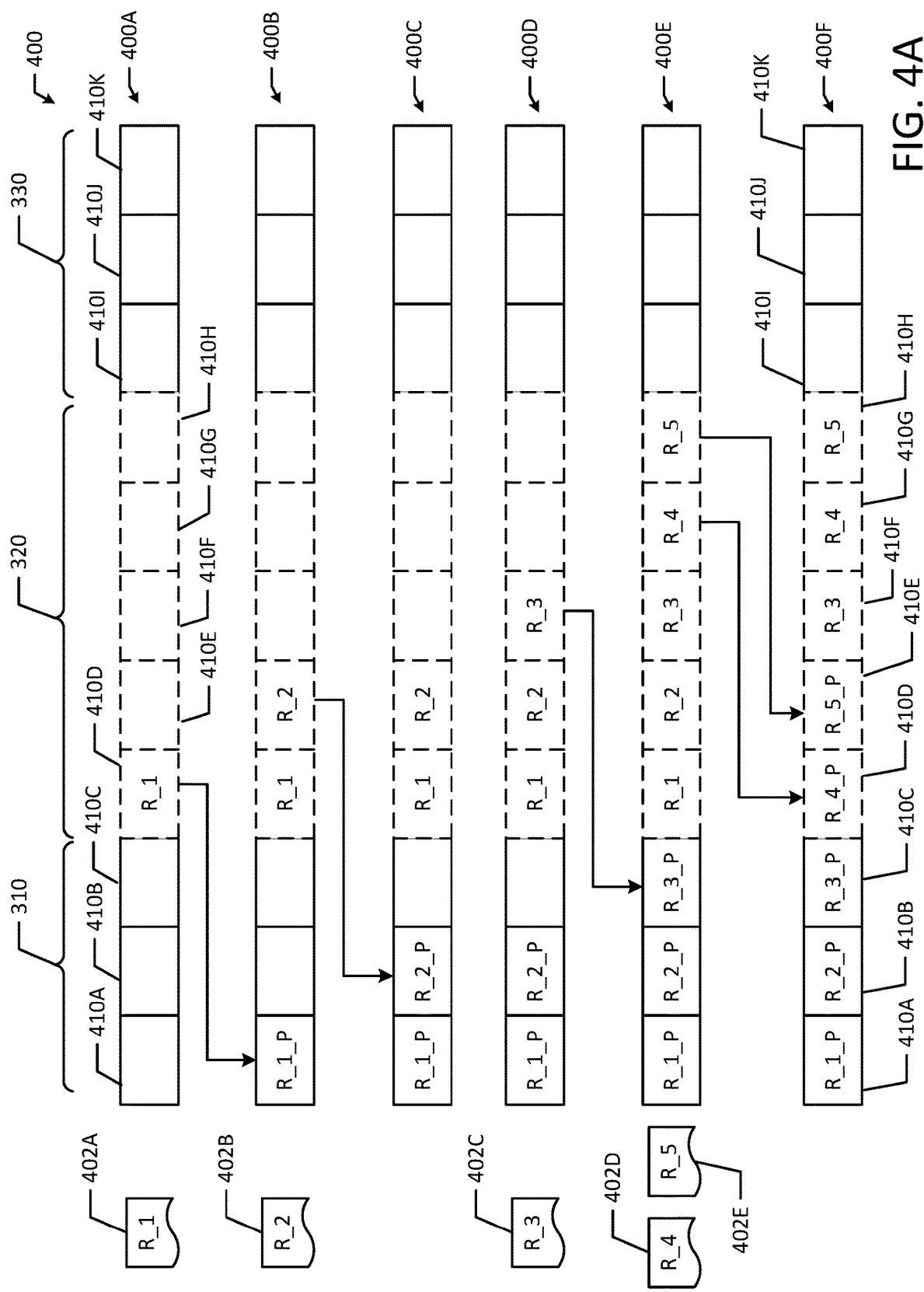

Partially Shared

Fully Shared

MEMORY CACHE-LINE BOUNCE REDUCTION FOR SHARED I/O RING STRUCTURES

BACKGROUND

Computer systems may routinely copy memory entries from one memory to a different memory. For example, while forwarding incoming networking traffic to a physical or virtual machine, packets may be received and later copied to another memory location. Processors may execute instructions to read, write, and copy memory entries, such as packet addresses to forward networking traffic to different machines. For example, memory entries may be temporarily stored in ring buffers on a first-in-first-out basis before being copied to the memory associated with a different machine. Specifically, incoming networking traffic may be stored on a ring buffer and later copied to virtual machine memory.

SUMMARY

The present disclosure provides new and innovative systems and methods for memory cache-line bounce reduction for memory rings. In an example, a system includes a memory, which includes a shared ring buffer. The shared ring buffer includes an active ring buffer and a processed ring buffer that partially overlap in an overlapping region. The active ring buffer has a first plurality of slots and the processed ring buffer has a second plurality of slots. The system also includes a producer processor and a consumer processor. The producer processor is configured to receive a first request associated with a first memory entry, store the first request in a first slot of the shared ring buffer at a first offset, receive a second request associated with a second memory entry, and store the second request in a second slot of the shared ring buffer. The second slot is located in the overlapping region and adjacent to the first slot. The consumer processor is configured to process the first request and write the processed first request in a third slot of the shared ring buffer at a second offset. The third slot is located in the processed ring buffer outside of the overlapping region, and the third slot is in a different cache-line than the second slot.

In an example, a method includes receiving, by a producer processor, a first request associated with a first memory entry. The method also includes storing, by the producer processor, the first request in a first slot of a shared ring buffer at a first offset. The shared ring buffer includes an active ring buffer and a processed ring buffer that partially overlap in an overlapping region. The active ring buffer has a first plurality of slots and the processed ring buffer has a second plurality of slots. Additionally, the method includes processing, by a consumer processor, the first request and writing, by the consumer processor, the processed first request in a second slot of the shared ring buffer at a second offset. The second slot is located in the processed ring buffer outside of the overlapping region. The producer processor receives a second request associated with a second memory entry and stores the second request in a third slot of the shared ring buffer. The third slot is located in the overlapping region and adjacent to the first slot, and the third slot is in a different cache-line than the second slot.

In an example, a system includes a memory including a shared ring buffer having a plurality of slots, a producer processor, and a consumer processor. The shared ring buffer includes an active ring buffer and a processed ring buffer that entirely overlap. The producer processor is configured to receive a first request associated with a first memory entry, store the first request in a first slot of the shared ring buffer, receive a second request associated with a second memory entry, and store the second request in a second slot adjacent to the first slot. The consumer processor is configured to process the first request and write the processed first request in the shared ring buffer in a third slot at an offset. The offset and the location of the first slot create a spacing between slots successively accessed by the consumer processor and the producer processor, and the third slot is in a different cache-line than the second slot.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 1 illustrates a block diagram of an example computing system according to an example embodiment of the present disclosure.

FIG. 3A illustrates a block diagram of an example partially shared memory ring.

FIG. 3B illustrates a block diagram of an example fully shared memory ring.

FIGS. 4A and 4B illustrate a block diagram of request processing in an example partially shared I/O ring structure.

DETAILED DESCRIPTION OF EXAMPLE EMBODIMENTS

Figure 2A:
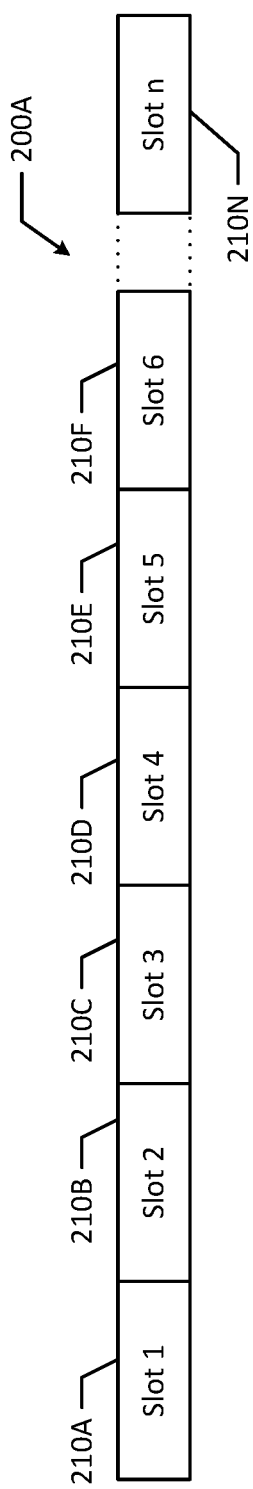
FIG. 2A illustrates a block diagram of an example memory ring according to an example embodiment of the present disclosure.

Techniques are disclosed for memory cache-line bounce reduction for shared memory ring structures (e.g., partially shared and fully shared I/O memory rings) when receiving data and processing data. For example, the data may be processed and copied from one memory location (e.g., ring buffer) to a different memory. Specifically, the techniques disclosed may be used when receiving network traffic and forwarding incoming network traffic to a virtual machine by a hypervisor, which may include receiving a packet from a network device and copying the packet to virtual machine memory.

Additionally, the techniques disclosed may be used when receiving disk write requests for network traffic, for example when processing or executing disk write requests to transmit network traffic (e.g., network traffic from a cloud computing platform) such as a data packet to or from virtual devices (e.g., a virtual machine). A guest operating system or associated guest driver may receive disk write requests and execute the requests such that a hypervisor can transmit the processed requests (e.g., packets) to/from virtual machines ("VMs") by copying memory entries from a ring buffer and transmitting the memory entries to virtual machine memory. Virtualization may allow a host machine to run multiple virtual environments, for example using a hypervisor (e.g., Kernel-based Virtual Machine ("KVM")) on an operating system, such as Red Hat® Enterprise Linux® ("RHEL"). The hypervisor may implement software devices or virtual devices. When handling network traffic (e.g., network traffic from a cloud computing platform such as the Red Hat® OpenStack® Platform), hypervisor vendors and operating system ("OS") vendors often attempt to improve networking speed for hypervisors for use in networking stacks as well as improving performance of the associated virtual and physical devices. An example vendor is Red Hat®, which offers RHEL.

Passing requests between different protection domains remains as a significant source of overhead in software systems. For virtual machines, this typically involves programming by the guest of the VM request data (e.g., a packet address) into a request ring or active ring data structure that is associated with a virtual device and accessible to a hypervisor. Similar to physical systems, passing requests involves programming by a device driver the request data (e.g., a packet address) into a request ring or active ring accessible to a device. As requests are processed, the processed requests are stored in a ring (e.g., processed ring) associated with the device to signal the request status back to the requestor (e.g., the driver).

The request ring data structure and the processed ring data structure may be split or shared. In the shared configuration, the same ring may be used for active and processed requests. In the split configuration, there are two separate rings (e.g., one for active requests and the other for processed requests). Unfortunately, the split configuration may be sub-optimal when the requests are produced and processed on two different processors or CPUs. For example, in the split configuration, two cache-lines are typically active at all times and move between the two processors for each request. Having two active cache-lines increases overhead of the system.

The problem of having multiple active cache-lines is solved with the shared configuration. In the shared configuration, the same memory is used for both active and processed requests, which halves the amount of cache used. In the shared configuration, the device overwrites an active request with a processed request. However, the shared structure also has a fundamental problem. In light-use scenarios where the ring is mostly empty, a new request is produced and the device may immediately start consuming the request. The device then writes the processed request out into the ring. However, typically multiple requests fit in a single cache-line and as a requester or producer (e.g., driver) attempts to produce another request while the previous request is overwritten by the consumer (e.g., device), both the producer (e.g., driver) and the consumer (e.g., device) may end up writing into the same cache-line, which causes a cache-line bounce.

Specifically, the shared ring data structure may experience performance bottlenecks in light-use scenario described above. For example, when a driver is not highly optimized, copying or recording may be faster than receiving packets. As a result, the ring may be empty or close to empty for a large part of the time, and as each request (e.g., memory entry or packet) is produced or made available in the shared ring buffer by the producer processor, the request may be immediately processed by the consumer processor, which may cause a cache-line to bounce between the processors and results in a significant slowdown. Due to the bottleneck and resulting slowdown from cache-line bounces, the producer processor may be unable to get ahead of the consumer processor resulting in cache-line bounces for each data operation in the ring buffer.

As described in the various examples disclosed herein, to reduce the frequency of cache-line bounces and prevent slowdown, the shared ring configuration may be used with an extended shared memory area. Specifically, the extended shared memory area is larger than the area required to hold a maximum number of outstanding requests. During request processing, instead of the two rings completely coinciding, the active requests are stored at an offset, ahead of the processed requests. For example, four 16 byte requests may fit in a 64 byte cache-line. The active request may be stored at an offset of at least 48 bytes, and the processed requests may be stored at an offset of 0 bytes (e.g., the active requests may be stored at least 3 slots ahead of the processed requests). Therefore, when a single new request is added to the ring, the next request will be written at an offset of 64 bytes (e.g., 48 bytes+16 bytes), which is in a different cache-line from where the processed requests are written. Creating and maintaining a spacing between the consumer processor and the producer processor prevents the cache-line from moving or bouncing multiple times in and out of the cache of one or more of the processors or CPUs. Preventing cache-line bouncing advantageously increases performance, especially for low latency applications (e.g., applications that process high volumes of data with minimal delay) by further increasing the throughput or volume of data that can be passed through the system without incurring any additional cache-line bouncing delays, which helps to minimize latency. Additionally, the systems and methods described herein improve performance for devices that can be adjusted to use a partially overlapping ring configuration, which is particularly relevant for software devices implemented by hypervisors.

In an example, the rings may be shifted such that the rings partially overlap. In another example, the rings may completely overlap. In an example, a completely overlapping ring may require an additional 48 bytes of memory (e.g., each slot occupies 16 bytes), which is smaller than doubling the size of the ring or increasing the ring by a power of two. By extending the ring size (e.g., by an additional 48 bytes) advantageously helps ensure that the same quantity (e.g., maximum quantity of requests) can be submitted to the extended shared ring. For example, an eight-slot ring extended by three slots (e.g., 48 bytes) to create an eleven-slot shared ring can accommodate eight requests while avoiding cache-line bouncing. Previous approaches to prevent cache-line bouncing typically involved doubling the size of the ring (e.g., making an eight-slot ring 16 slots). Thus, the producer processor may advantageously produce or store requests (e.g., packets or packet addresses) elsewhere in the ring (e.g., a few slots ahead of the consumer processor) to prevent cache-line bounces between the producer processor and consumer processor, even when the ring is empty or almost empty. Thus, cache-line bounces are advantageously reduced and performance is improved. For example, the modified ring configuration may improve packet throughput by approximately ten percent or more. Additionally, performance (e.g., reduced latency) and throughput improvements may be achieved without doubling the ring size. Furthermore, memory overhead may be further reduced by increasing the size of a request (e.g., by using a single ring entry for a batch of requests).

FIG. 1 depicts a high-level component diagram of an example computing system 100 in accordance with one or more aspects of the present disclosure. The computing system 100 may include an operating system (e.g., host OS 186), one or more virtual machines (VM 170A-B), nodes (e.g., nodes 110A-B), a consumer processor (e.g., device) 124, a producer processor (e.g., driver) 128, and memory 134 including a ring buffer 138. Ring buffer 138 may be a data structure using a single, fixed-size buffer as if it were connected end-to-end (e.g., in a ring). In an example, the ring buffer 138 may be a first-in-first-out (FIFO) data structure. For example, requests associated with memory entries such as packet addresses may be written into and retrieved from the ring buffer 138 based on when the request was first produced to the ring buffer 138. Additionally, the ring buffer 138 may have a plurality of slots, which may store memory entries. The slots may be tracked by pointers or indices, or through the use of a counter. In an example, the counter may be configured to track a position of a current slot accessed by the producer processor 128, the consumer processor 124, or both the producer processor 128 and consumer processor 124. Other methods may be used to prevent either the consumer processor (e.g., device) 124 or the producer processor (e.g., driver) from over-writing ring entries while the ring is full. For example, the producer processor 128 may use a counter or a pointer to wrap around the ring buffer 138 while avoiding over-writing active ring entries while the ring is full (at least until some are processed by the consumer processor 124).

Virtual machines 170A-B may include a guest OS, guest memory, a virtual CPU (VCPU), virtual memory devices (VIVID), and virtual input/output devices (VI/O). For example, virtual machine 170A may include guest OS 196A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B, virtual machine memory 195B, a virtual CPU 190B, a virtual memory devices 192B, and virtual input/output device 194B. Virtual machine memory 195B may include one or more memory pages.

The computing system 100 may also include a hypervisor 180 and host memory 184. Hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

In an example, a virtual machine 170A may execute a guest operating system 196A and run applications 198A-B which may utilize the underlying VCPU 190A, VIVID 192A, and WO device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186A. In an example, a device may be implemented as a virtual machine (e.g., virtual machine 170A-B).

The computer system 100 may include one or more nodes 110A-B. Each node 110A-B may in turn include one or more physical processors (e.g., CPU 120A-C) communicatively coupled to memory devices (e.g., MD 130A-C) and input/output devices (e.g., I/O 140A-B). Each node 110A-B may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

In an example, consumer processor (e.g., device) 124 and producer processor (e.g., driver) 128 may be one of the other processor(s) illustrated in FIG. 1, such as a CPU (e.g., CPU 120A-C) on node 110A-B. Similarly, ring buffer 138 may be stored in a memory device, and may be one of the other memory(s) illustrated in FIG. 1, such as MD 130A-C on node 110A-B. Additionally, consumer processor 124 and producer processor 128 may be different cores on the same physical processor. The producer processor 128 may be configured to receive one or more requests (e.g., memory entries) and store the requests or associated memory entries in the ring buffer 138 at a first offset (e.g., the start of the active ring buffer in the partially shared configuration). In an example, the offset may be a slot that is indicated by a pointer. The producer processor 128 may receive and produce the next request in the next successive slot after the first produced request. The consumer processor 124 may be configured to consume and process the requests and write the processed requests at a second offset in the ring buffer 138 (e.g., the start of the processed ring buffer in the partially shared configuration).

By producing requests (e.g., memory entries) at the first offset and writing processed or consumed memory entries at the second offset, a spacing is created between the producer processor 128 and the consumer processor 124 and cache-line bounces are prevented. Specifically, memory operations can be handled by both the producer processor and consumer processor without a cache-line bounce thereby improving performance (e.g., reduced latency and increased throughput).

As used herein, physical processor or processor 120A-C, 124, and 128 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node, including the connections between a processor 120A-C and a memory device 130A-C may be provided by one or more local buses of suitable architecture, for example, peripheral component interconnect (PCI).

Figure 2B:
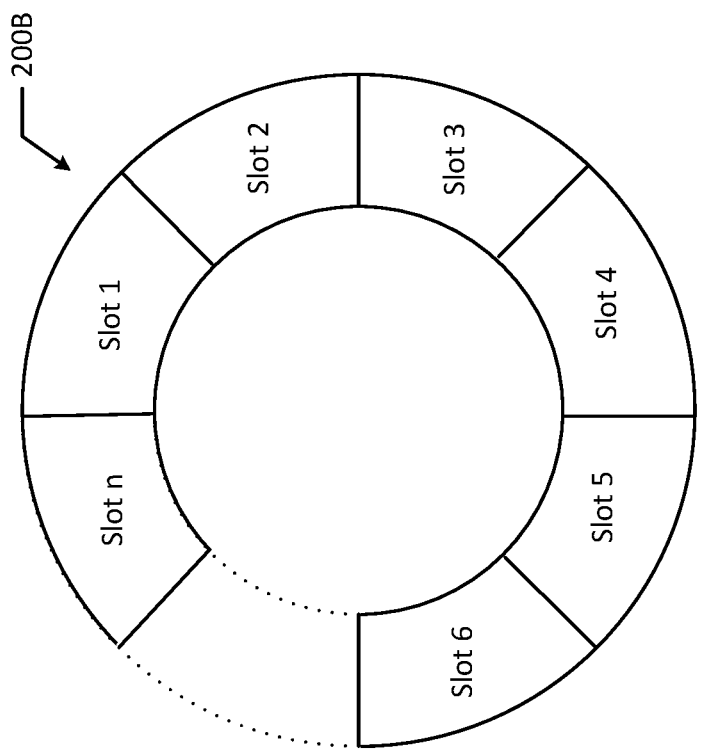
FIG. 2B illustrates a block diagram of an example memory ring according to an example embodiment of the present disclosure.

FIGS. 2A and 2B illustrate block diagrams of example ring buffers 200A and 200B (generally referred to as ring buffer 200). For example, FIG. 2A illustrates a linear buffer implementation of ring buffer 200A while FIG. 2B illustrates the "ring" structure of ring buffer 200B. It should be appreciated that ring buffers 200A-B may be the same actual memory structure illustrated in two different ways. Ring buffers 200A-B may in be located in cacheable memory, such as L1 cache if on the same physical processor but on different CPU cores. In another example, the ring buffer 200A-B may be on a different level of cache other than L1. Additionally, ring buffers 200A-B may include a plurality of slots (e.g., slots 210A-N). For example, slots 210A-N may correspond to Slot_1 to Slot_n respectively. Each slot may include a request or memory entry, such as a data packet, a packet address, or the like. Additionally, slots may be initially empty or may include an invalid value, such as "0". For example, a slot with a memory address of "0" may be used to indicate an empty slot or invalid slot. Conversely, a valid slot may include a request or memory entry, such as a data packet or a packet address.

FIGS. 3A and 3B illustrate block diagrams of example ring buffers 300A-B (generally referred to herein as ring buffer 300, 200) in a partially shared configuration (300A illustrated in FIG. 3A) and a fully shared configuration (300B illustrated in FIG. 3B). In the partially shared configuration, the shared ring buffer 300A includes a processed ring buffer 340 and an active ring buffer 350. The processed ring buffer 340 has a non-overlapping region 310 and the active ring buffer 350 has a non-overlapping region 330. Both the active ring buffer 350 and the processed ring buffer 340 have a region that overlaps (e.g., overlapping region 320). The active ring buffer 350 may include active slots 'A_0' to 'A_7' to store received requests. Similarly, the processed ring buffer 340 may include processed or consumed slots 'C_0' to 'C_7' to store processed or consumed requests. As illustrated in FIG. 3A, processed or consumed slots 'C_3' to 'C_7' correspond to active slots 'A_0' to 'A_4' in the overlapping region 320.

For example, the producer processor 128 may receive a request and store the request in the shared ring buffer 300A in slot 'A_0', which is the first slot of the active ring buffer 350 and at an offset of 48 bytes from the start of the ring (e.g., in the fourth slot). Additionally, the consumer processor 124 may process the request and write the processed request in slot 'C_0', which is the first slot of the processed ring buffer 340 shared ring buffer at an offset of 0 bytes of the shared ring buffer 300A. In this example, a typical cache-line may be 64 bytes and contain four slots. When the producer processor 128 receives and stores another request in slot 'A_4' adjacent to slot 'A_3', the producer processor 128 may be accessing a different cache-line than the consumer processor 124 used when accessing slot 'C_0' for the first processed request. Since the consumer processor 124 and the producer processor 128 access different cache-lines, cache-line bounces are reduced or prevented entirely between the producer processor 128 and the consumer processor 124, which improves system performance (e.g., reduced latency and increased throughput).

In the fully shared configuration, the shared ring buffer 300B includes a plurality of slots (e.g., slot_0 to slot_10) that are shared between the active ring and the processed ring. Similar to the partially shared configuration, the consumer processor 124 writes processed requests and the producer processor 128 stores received requests at different offsets to prevent cache-line bouncing.

FIG. 4A illustrates a block diagram of request processing in an example shared memory ring, such as ring buffer 138 or 400A-L (generally referred to herein as shared ring buffer 200, 300, 400). For example, memory ring 400 is illustrated as 400A-L, which represents different states of shared memory ring 400 at different points in time. Memory ring or ring buffer 400 may include eleven slots (e.g., slots 410A-K). In an example, each slot may include a memory entry, such as a request 'R_1' to 'R_11'. In an example, the request may be addresses, such as packet address 'P_1' to 'P_11' or an invalid value, such as a NULL value. As illustrated in ring buffer 400A, slot 410D includes request 402A (e.g., 'R_1') and the other slots (e.g., slots 410A-C and 410E-K) are empty or include an invalid value, such as a NULL value. The request 402A (e.g., 'R_1', which may be a packet address) may be written into the memory ring or ring buffer 400 by a producer processor, such as producer processor 128. In the illustrated example, a cache-line may occupy four slots or 64 bytes, such that slots 410A-D are in a first cache-line, slots 410E-H are in a second cache-line, and slots 410I-K are in a third cache-line.

Additionally, indices or pointers (e.g., pointer 620 illustrated in FIG. 6) may indicate specific slots in ring buffer 400. For example, a pointer (e.g., pointer 620) may designate or indicate which slot is the next slot that either the producer processor 128 or the consumer processor 124 accesses. The pointer (e.g., pointer 620) may be advanced to successive slots as the producer processor produces request to slots. In an example, the pointer (e.g., pointer 620) may be tracked by a counter. Additionally, the pointer (e.g., pointer 620) may be maintained in a cache-line.

Requests or memory entries, such as packets (e.g., requests 402A-K) may be received by producer processor 128. After one or more requests are received, the producer processor 128 may start producing the requests at a later time. For example, as illustrated by ring buffer 400A, the producer processor 128 may store request 402A (e.g., 'R_1') at an offset (e.g., '48' bytes), which positions the request in slot 410D, of the shared ring buffer 400. As illustrated in FIG. 4A, slot 410D is in the overlapping region 320 of the active ring buffer 340. Then, in 400B, the consumer processor 124 may process the request 402A (e.g., 'R_1') and write the processed request at an offset of '0' bytes, which positions the processed request 402A (e.g., 'R_1_P') in slot 410A outside of the overlapping region 320 and in the non-overlapping region 310 of the processed ring buffer 340.

Figure 4B:
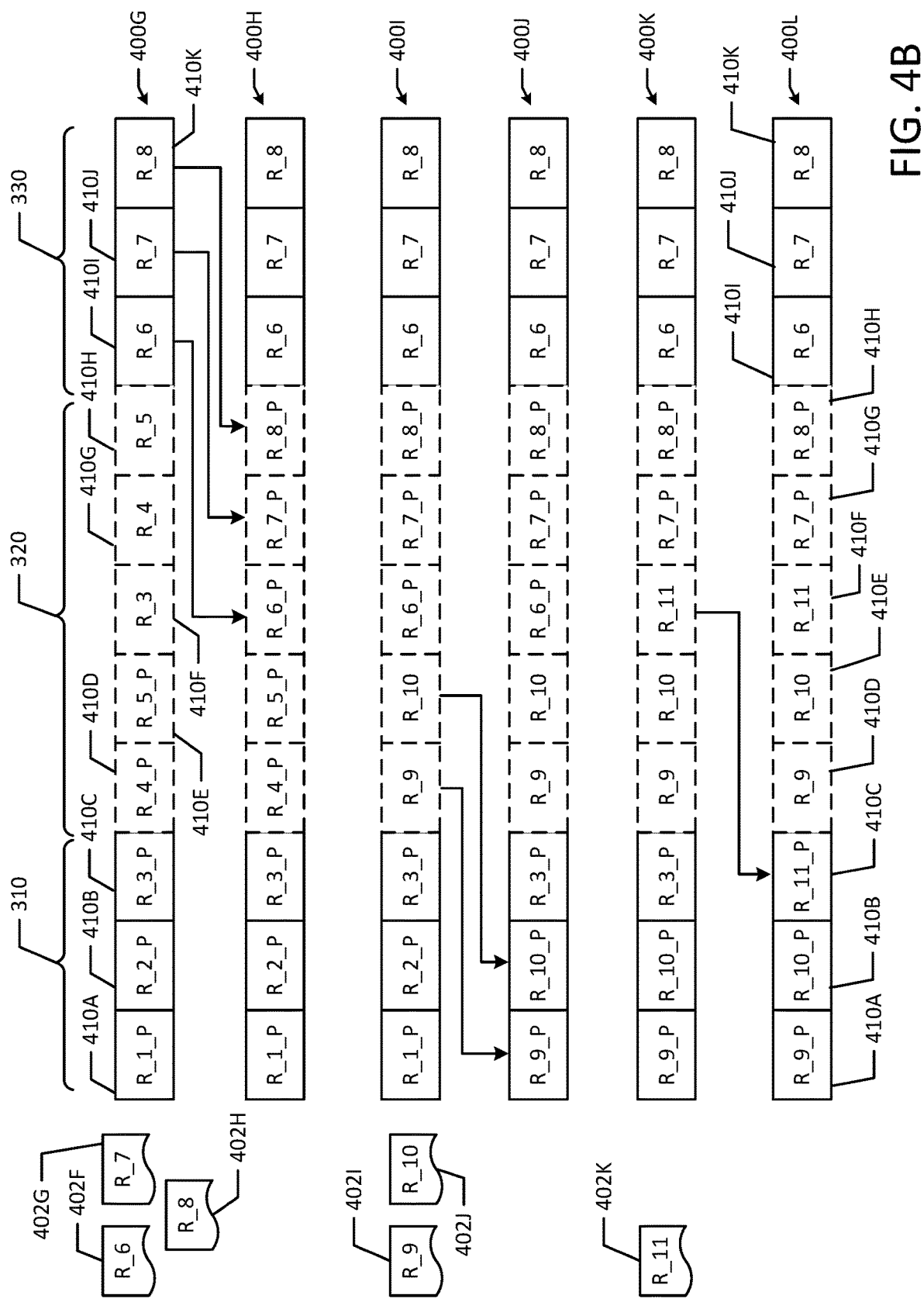

The ring buffer 400 is shared and the same memory may be used for both active and processed requests. The producer processor 128 stores requests (e.g., request 402A) or request data in the active ring buffer 340 (e.g., a request ring data structure). For VMs, the producer processor 128 may be a guest of the VM, which may program the request data 'R_1' (e.g., request 402A such as a packet address) into the active ring buffer 340. The active ring buffer 340 may be associated with a virtual device and accessible to the hypervisor 180. Similarly for physical systems, the producer processor 128 may be a device driver, which may program the request data 'R_1' (e.g., request 402A such as a packet address) into the active ring buffer 340. Additionally, the active ring buffer may be accessible to a device (e.g., consumer processor 124). As the requests are processed by the consumer processor 124, the processed requests (e.g., 'R_1_P') are stored in a ring associated with the device (e.g., the processed ring 340) to signal the status of the request back to the requestor or producer processor 128 (e.g., the device driver). As illustrated in FIGS. 4A and 4B, the consumer processor 124 (e.g., device) may overwrite active requests (e.g., 'R_1') with processed requests (e.g., 'R_4_P') to signal the status of the request to another device, such as the requestor (e.g., producer processor 128 or driver). A request (e.g., 'R_1') may retain its value as it is processed and written as a processed request (e.g., 'R_1_P') such that both values of 'R_1' and 'R_1_P' are the same.

The producer processor may then receive request 402B and may produce the request in slot 410E, which is a full cache-line ahead of slot 410A and thus prevents a cache-line bounce between the producer processor 128 and the consumer processor 124. Similar as before, at 400C, the consumer processor 124 may process the request 402B (e.g., 'R_2') and write the processed request 'R_2_P' in slot 410B, which is the slot adjacent to slot 410A that contains processed request 'R_1_P'.

As illustrated in ring buffer 400D, the producer processor 128 receives request 402C (e.g., 'R_3') and produces the request in slot 410F. Again, the consumer processor 124 processes the request and writes the processed request (e.g., 'R_3_P') into slot 410C, as illustrated in ring buffer 400E. As discussed above, a cache-line may occupy four slots or 64 bytes, such that slots 410A-D are in a first cache-line, slots 410E-H are in a second cache-line, and slots 410I-K are in a third cache-line.

The producer processor 128 may also receive requests 402D and 402E (e.g., 'R_4' and 'R_5') and may produce the requests to the ring buffer in slots 410G and 410H respectively, which are the last slots in the overlapping region 320 in the illustrated example. At 400F, after the producer processor 128 produces the requests, the consumer processor 124 may process the requests 402D and 402E and write the processed requests (e.g., 'R_4_P' and 'R_5_P') in slots 410D and 410E. The producer processor 128 and consumer processor 124 may store and write processed requests one-by-one or in batches. For example, producer processor 128 may store request 'R_4' and then consumer processor 124 may write the processed request 'R_4_P' in slot 410D before the producer processor 128 stores request 'R_5'. In another example, the producer processor 128 may store both request 'R_4' and 'R_5' before the consumer processor 124 processes either request.

At a later time, as illustrated in ring buffer 400G, the producer processor 128 may receive another batch of requests 402F-H (e.g., requests 'R_6', 'R_7' and 'R_8'). The producer processor 128 produces the requests to the ring buffer in slots 410I-K respectively, which are the last slots in the non-overlapping region 330 of the active ring buffer 350. After the producer processor 128 produces the requests, the consumer processor 124 may process the requests 402F to 402H, which were produced in slots 410I-K, and write the processed requests (e.g., 'R_6_P', 'R_7_P' and 'R_8_P') in slots 410F to 410H respectively (as illustrated in 400H) by overwriting the previous entries of 'R_3', 'R_4' and 'R_5'. The consumer processor overwrites old active requests (e.g., 'R_3', 'R_4' and 'R_5') with processed requests (e.g., 'R_6_P', 'R_7_P' and 'R_8_P') to signal the status of the newly processed requests back to the requestor (e.g., the producer processor 128 or driver). As mentioned above, the producer processor 128 and consumer processor 124 may store and write processed requests one-by-one or in batches. Since slots 410E-H are in the second cache-line and slots 410I-K are in the third cache-line, the consumer processor 124 and producer processor 128 may produce and consume requests 'R_6', 'R_7' and 'R_8' (in parallel or even simultaneously) without causing a cache-line bounce between the consumer processor 124 and the producer processor 124.

In the illustrated example, at 400I, the producer processor 128 receives requests 402I and 402J and produces or stores the requests in slots 410D and 410E, which are the first two slots in the overlapping region 320 of the shared ring buffer. Additionally, at 400J, the consumer processor 124 writes the processed requests (e.g., 'R_9_P' and 'R_10_P') in slots 410A and 410B, which are the first two slots in the non-overlapping region of the processed ring buffer 340. The processed requests may be copied to another location, for example consuming or processing a request may include copying the request (e.g., packet data) to another memory location, such as VM memory 195A. For example, the consumer CPU 124 may retrieve packet address associated with the request and then copy the packet associated with packet address to VM memory 195A. Additionally, by writing the processed request (e.g., 'R_9_P') into the processed ring buffer 340, the consumer processor 124 signals to the producer processor 128 the status of 'R_9' (e.g., request 'R_9' has been processed).

As illustrated in 400I to 400K, the consumer processor 124 writes processed requests in the processed ring buffer 340 to maintain a spacing between the produced requests and consumed requests. For example, after writing processed request 'R_8 P' in slot 410H, which is the last slot in the processed ring buffer and also the last slot in the overlapping region 320, the consumer processor 124 wraps around and writes the next processed request in slot 410A (e.g., the first slot in the processed ring buffer 340). Because the active ring buffer 350 and the processed ring buffer 340 are partially shared, instead of fully shared, the non-overlapping regions 310 and 330 serve to maintain a spacing between the consumer processor 124 and producer processor 128 to prevent cache-line bouncing.

Then, the producer processor 128 receives request 402K (e.g., 'R_11') and stores the request in slot 410F, which is the second cache-line. After the producer processor 128 produces the request, the consumer processor 124 consumes the request and writes the processed request 'R_11_P' in slot 410C (as illustrated in 400L), which is the last slot in the non-overlapping region 310 of the processed ring buffer 340. Slot 410C is in the first cache-line and thus the consumer processor 124 and the producer processor 128 are accessing different cache-lines while executing in 400K and 400I and operate without causing a cache-line bounce when producing and consuming request 402K.

Figure 5A:
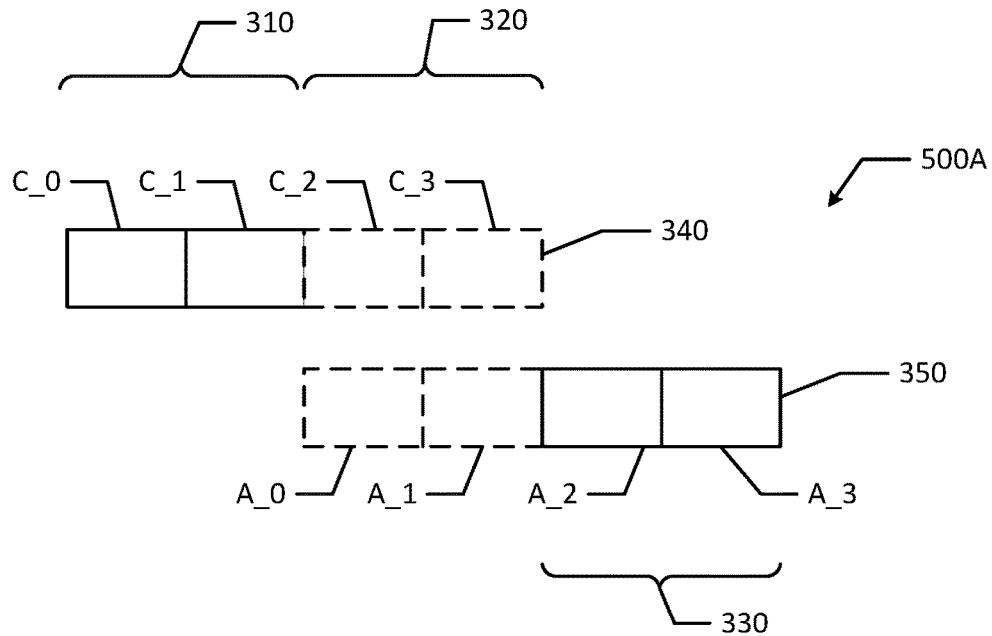
FIG. 5A illustrates a block diagram of an example partially shared memory ring.
Figure 5B:
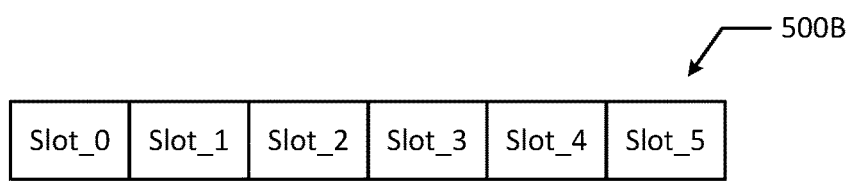
FIG. 5B illustrates a block diagram of an example fully shared memory ring.

FIGS. 5A and 5B illustrate block diagrams of other example ring buffers 500A-B in a partially shared configuration (500A illustrated in FIG. 5A) and a fully shared configuration (500B illustrated in FIG. 5B). In the partially shared configuration, the shared ring buffer 500A includes a processed ring buffer 340 and an active ring buffer 350. The processed ring buffer 340 has a non-overlapping region 310 and the active ring buffer 350 has a non-overlapping region 330. Both the active ring buffer 350 and the processed ring buffer 340 have a region that overlaps (e.g., overlapping region 320). The active ring buffer 350 may include active slots 'A_0' to 'A_3' to store received requests. Similarly, the processed ring buffer 340 may include processed or consumed slots 'C_0' to 'C_3' to store processed or consumed requests.

As illustrated in FIG. 5A, processed or consumed slots 'C_2' and 'C_3' correspond to active slots 'A_0' and 'A_1' in the overlapping region 320. For example, the producer processor 128 may receive a request and store the request in the shared ring buffer 500A in slot 'A_0', which is the first slot of the active ring buffer 350 and at an offset of 48 bytes (when each slot occupies 24 bytes) from the start of the ring (e.g., in the third slot). In another example, each slot may occupy 16 bytes and the offset would then by 32 bytes from the start of the ring 500A. A ring buffer (e.g., ring buffer 500A) may be a pointer rings that stores pointers (typically 8 bytes) and each slot may occupy 8 bytes such that eight slots occupy a 64 byte cache-line. In other applications, the ring buffer (e.g., ring buffer 500A) may be an I/O ring that can pass around larger amounts of data, such that the slots may hold 16 bytes, 24 bytes, etc. Additionally, the consumer processor 124 may process the request and write the processed request in slot 'C_0', which is the first slot of the processed ring buffer 340 at an offset of 0 bytes of the shared ring buffer 500A. In this example, a typical cache-line may contain two slots (e.g., 48 bytes). When the producer processor 128 receives and stores another request in slot 'A_1' adjacent to slot 'A_0', the producer processor 128 may be accessing a different cache-line than the consumer processor 124 used when accessing slot 'C_0' for the first processed request, which advantageously prevents a cache-line bounce between the producer processor 128 and the consumer processor 124.

In the fully shared configuration, the shared ring buffer 500B includes a plurality of slots (e.g., slot_0 to slot_5) that are shared between the active ring and the processed ring. Similar to the partially shared configuration, the consumer processor 124 writes processed requests and the producer processor 128 stores received requests at different offsets to prevent cache-line bouncing.

Figure 6:
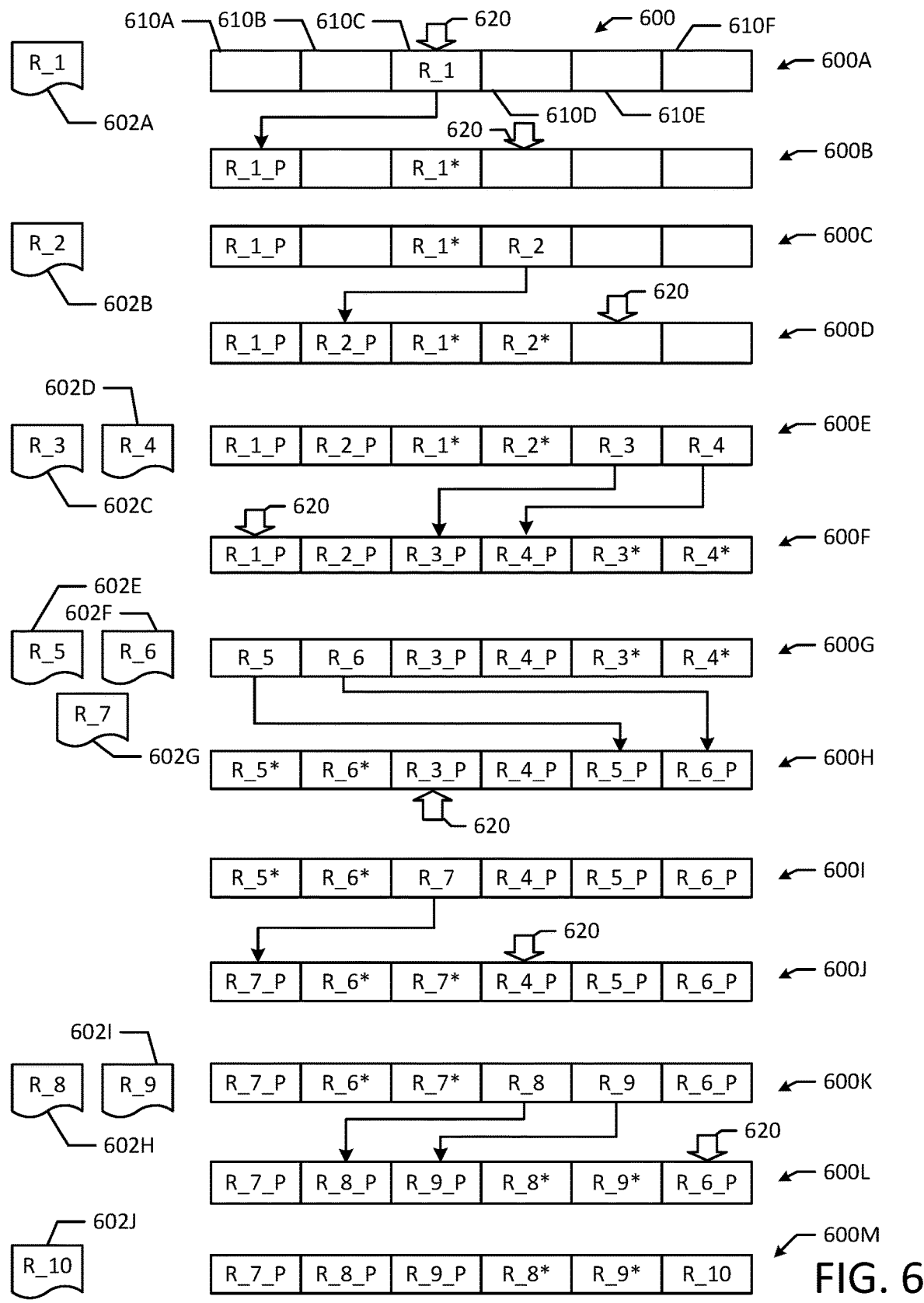
FIG. 6 illustrates a block diagram of request processing in an example fully shared I/O ring structure.

FIG. 6 illustrates a block diagram of request processing in an example shared memory ring, such as ring buffer 138 or 600 (generally referred to herein as shared ring buffer 200, 300, 400, 500, 600). For example, memory ring 600 is illustrated as 600A-M, which represents different states of shared memory ring 600 at different points in time. Memory ring or ring buffer 600 may include six slots (e.g., slots 610A-F). In an example, each slot may include a memory entry, such as a request 'R_1' to 'R_10'. In an example, the request may be addresses, such as packet address 'P_1' to 'P_10' or an invalid value, such as a NULL value. As illustrated in ring buffer 600A, slot 610C includes request 602A (e.g., 'R_1') and the other slots (e.g., slots 610A-B and 610D-F) are empty. The request 602A (e.g., 'R_1', which may be a packet address) may be written into the memory ring or ring buffer 600 by a producer processor, such as producer processor 128. In the illustrated example, the producer processor 128 stores the request 'R_1' in the fully shared memory ring at an offset (e.g., 64 bytes) such that the request is stored in a third slot 610C. As previously mentioned, a pointer 620 may indicate the production location in the ring buffer 600 (e.g., which slot) for the request (e.g., request 602A). After a request (e.g., request 402A) is produced to that location, the pointer 620 may be advanced to the next slot in the ring that the producer processor 128 will produce the next request (e.g., request 602B).

As illustrated by ring 600B, the consumer processor 124 processes the request and writes the processed request in the fully shared ring buffer at a second offset (e.g., 0 bytes), such that it is written in the first slot 610A. A processed request is denoted by an '*' such that after the consumer processor 124 processes the request in slot 610C and writes the processed request in slot 610A, the original request (e.g., 'R_1') is denoted as "R_1*" to indicate that the consumer processor has processed that request and written the processed request in a different slot. 600B also illustrates the advancement of the pointer 620 to the next slot (e.g., slot adjacent to the previously produce request 'R_1').

At 600C, the producer processor 128 receives another request 602B (e.g., request 'R_2') and stores the request in slot 610D, which is adjacent to slot 610C. Then, the consumer processor 124 processes the request and writes the processed request in slot 610B, adjacent to the last processed request in slot 610A. At 600E and 600F, the producer processor 128 receives a batch of requests 602C and 602D (e.g., 'R_3' and 'R_4') and the stores the requests in slots 610E and 610F respectively. Again, 600D also illustrates the advancement of the pointer 620. Additionally, the consumer processor 124 consumes the requests and writes the processed requests in slots 610C and 610E. In the illustrated example, at 600F, the consumer processor overwrites the previously processed requests 1* and 'R_2*' with the processed requests 'R_3_P' and 'R_4_P' and maintains the spacing of two slots or an entire cache-line to prevent cache-line bounces between the consumer processor 124 and the producer processor 128.

At a later time, requests 602E-G may be sent to the producer processor 128. The producer processor may store a subset of the batch of requests (e.g., 'R_5' and 'R_6') in the fully shared ring buffer to maintain the spacing between the consumer processor 124 and the producer processor 128 (illustrated at 600G). The spacing of two slots or an entire cache-line advantageously prevents cache-line bounces between the consumer processor 124 and the producer processor 128, which improves performance by increasing throughput and decreasing latency. Then, after the consumer processor 124 consumes the requests and writes the processed requests on slots 610D and 610E (illustrated at 600H and 600I), the producer processor 128 may store request 'R_7' in slot 610A, which is in a different cache-line than slot 610D, which was the last slot the consumer processor 124 accessed. In this example, the producer processor stores 'R_7' in a slot that previously had a processed request 'R_3_P' and replaces that entry by over-writing the processed request 'R_3_P' with the newly received request 'R_7'.

As illustrated by ring 600J, the consumer processor 124 processes the request 'R_7' and writes the processed request 'R_7_P' in the fully shared ring buffer 600 in the first slot 610A. Then, at 600K, the producer processor 128 receives another group or batch of requests 602H-I (e.g., request 'R_8' and 'R_9') and stores the requests in slots 610D and 610E. The requests may be produced one-by-one such that the pointer 620 would advance from slot 610D to slot 610E after 'R_8' was produced to indicate that slot 610E is the location to produce 'R_9'. After producing 'R_9', the pointer 620 may then advance to slot 610F (as illustrated in 600L). Then, the consumer processor 124 processes the requests and writes the processed requests in slot 610B and 610C, adjacent to the last processed request in slot 610A (illustrated in 600L). At 600M, the producer processor 128 receives request 602J (e.g., 'R_10') and the stores the request in slot 610F. At this point in the process, the producer processor 128 is accessing a different cache-line than the consumer processor 124 and has maintained the spacing of two slots or an entire cache-line to prevent cache-line bounces between the consumer processor 124 and the producer processor 128.

In an example, the shared memory area (e.g., the overlapping region 320) may be enlarged to accommodate a maximum number of outstanding requests. In an example, the size of the overlapping region may also be related to the quantity of cache-lines used by the ring buffer 138, which may advantageously prevent cache-line bounces between the producer processor 128 and the consumer processor 124 because each processor may be accessing different cache-lines. For example, after the producer processor 128 produces requests or memory entries in slots in a first cache-line, it may start producing additional memory entries in a different cache-line (e.g., second cache-line) as the consumer processor 124 is consuming memory entries or slots in the first cache-line, thereby allowing the producer processor 128 and the consumer processor 124 to simultaneously execute memory operations in separate cache-lines.

Figure 7A:
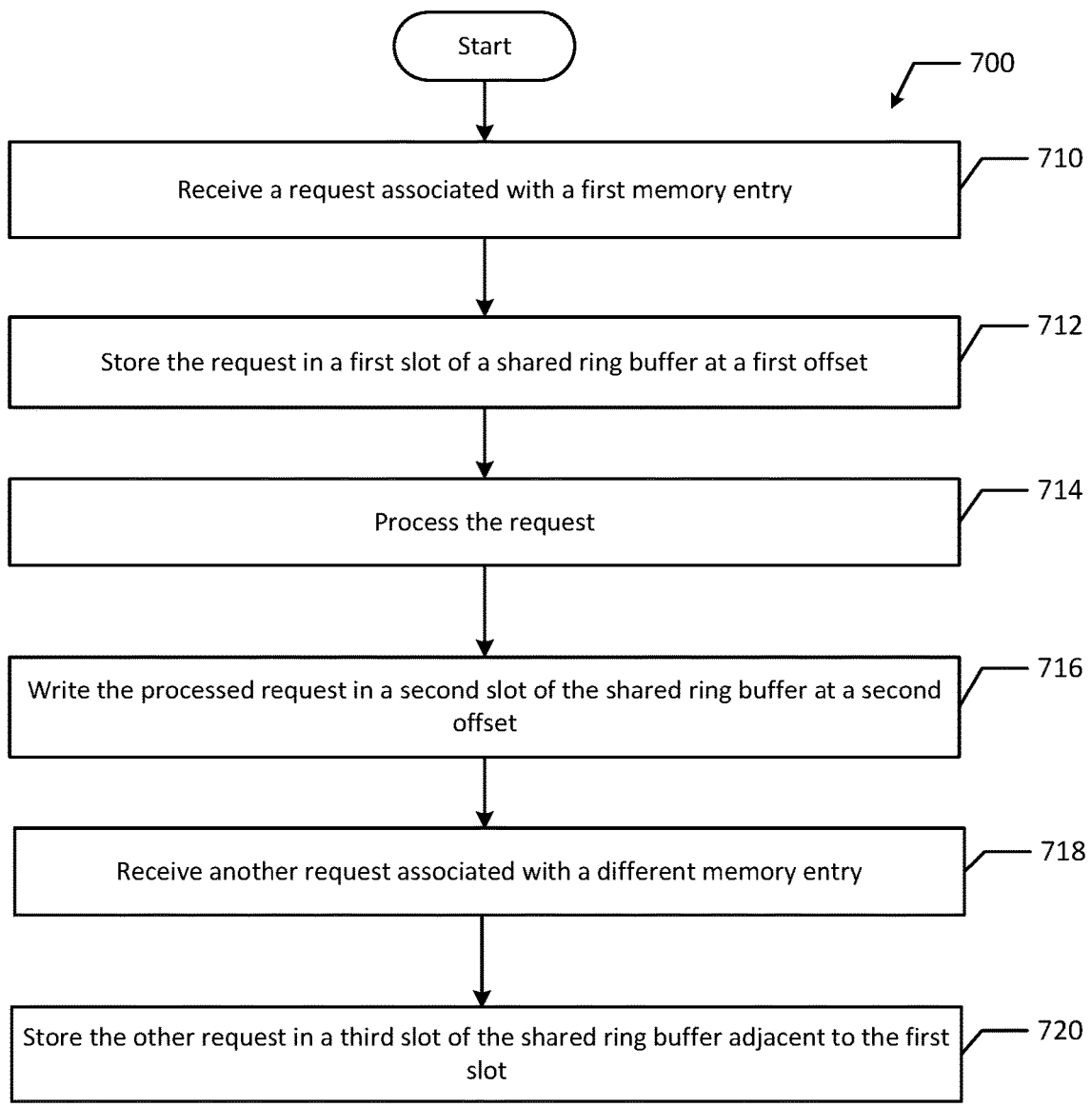
FIG. 7A illustrates a flowchart of an example process for memory cache-line bounce reduction in a memory ring according to an example embodiment of the present disclosure.

FIG. 7A illustrates a flowchart of an example method 700 for memory cache-line bounce reduction in a memory ring according to an example of the present disclosure. Although the example method 700 is described with reference to the flowchart illustrated in FIG. 7A, it will be appreciated that many other methods of performing the acts associated with the method 700 may be used. For example, the order of some of the blocks may be changed, certain blocks may be combined with other blocks, and some of the blocks described are optional. The method 700 may be performed by processing logic that may comprise hardware (circuitry, dedicated logic, etc.), software, or a combination of both.

The example method 700 includes receiving a request associated with a first memory entry (block 710). For example, a producer processor 128 may receive a request associated with a memory entry (e.g., packet). In an example, the memory entry may be a data packet. Then, the method includes storing the request in a first slot of a shared ring buffer at a first offset (block 712). For example, the producer processor 128 may store the request in a slot provided at an offset. In the partially shared ring configuration, the first slot may be the first slot of the active ring buffer 350, which may be the first slot in the overlapping region 320.

Then, the method includes processing the request (block 714). For example, the request may be processed by a consumer processor 124 similar to what has been described and illustrated in FIGS. 4A-4B and FIG. 6. Additionally, method 700 includes writing the processed request in a second slot of the shared ring buffer at a second offset (block 716). The second slot may be the first slot in the processed ring buffer 340 for the partially shared ring configuration, which is in the non-overlapping region of the processed ring buffer 340. The first and second offset may be chosen based on at least one of the size of the ring buffer 138, the size of the overlapping region 320, or the size of a cache-line. Additionally, the first and second offsets may be chosen based on what portions (e.g., which specific slots) of the ring buffer 138 occupy different cache-lines such that the producer processor 128 and the consumer processor 124 maintain a spacing. The method also includes receiving another request associated with a different memory entry (block 718). Then, the method includes storing the other request in a third slot of the shared ring buffer adjacent to the first slot (block 720). In an example, the third slot is adjacent the first slot and may also be in the overlapping region 320 of the partially shared ring buffer.

Figure 7B:
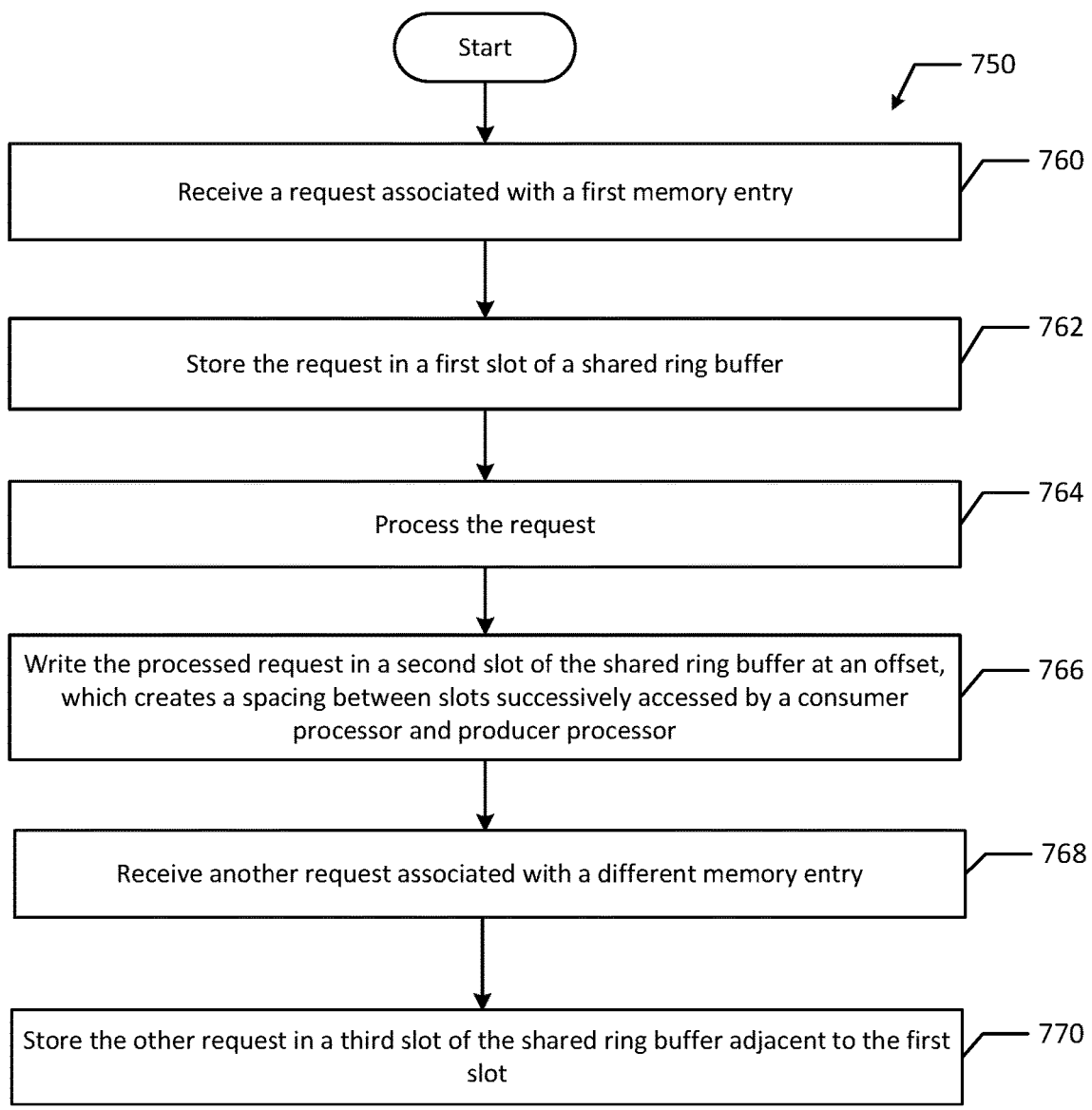
FIG. 7B illustrates a flowchart of an example process for memory cache-line bounce reduction in a memory ring according to an example embodiment of the present disclosure.

FIG. 7B illustrates a flowchart of an example method 750 for memory cache-line bounce reduction in a memory ring according to an example of the present disclosure. Although the example method 750 is described with reference to the flowchart illustrated in FIG. 7B, it will be appreciated that many other methods of performing the acts associated with the method 750 may be used. For example, the order of some of the blocks may be changed, certain blocks may be combined with other blocks, and some of the blocks described are optional. The method 750 may be performed by processing logic that may comprise hardware (circuitry, dedicated logic, etc.), software, or a combination of both.

The example method 750 includes receiving a request associated with a memory entry (block 760). Requests may be received individually or received in batches. Then the method includes storing the request in a first slot of a shared ring buffer (block 762). The producer processor 128 may store the request in the first slot, which first slot may be an intermediate slot in the ring buffer at an offset spaced from the start of the ring buffer. After storing the request, the method includes processing the request (block 764). For example, a consumer processor 124 may process the request. Then, the method includes writing the processed request in a second slot of the shared ring buffer at an offset, which creates a spacing between slots successively accessed by a consumer processor and a producer processor (block 766). The spacing may be adapted such that the consumer processor 124 and the producer processor 128 can perform memory operations on different cache-lines in parallel or simultaneously, without causing a cache-line bounce. Method 750 includes receiving another request associated with a different memory entry (block 768). The request may be a second request from the original batch of requests. Additionally, the request may be a new request for requests that are received one-by-one by the producer processor 128. The method also includes storing the other request in a third slot of the shared ring buffer adjacent to the first slot (block 770). As discussed above, the third slot may be adjacent the first slot (e.g., the slot used for the last produced entry). Additionally, the third slot may be indicated by a counter or a pointer that tracks the producer processor's progress.

Figure 8A:
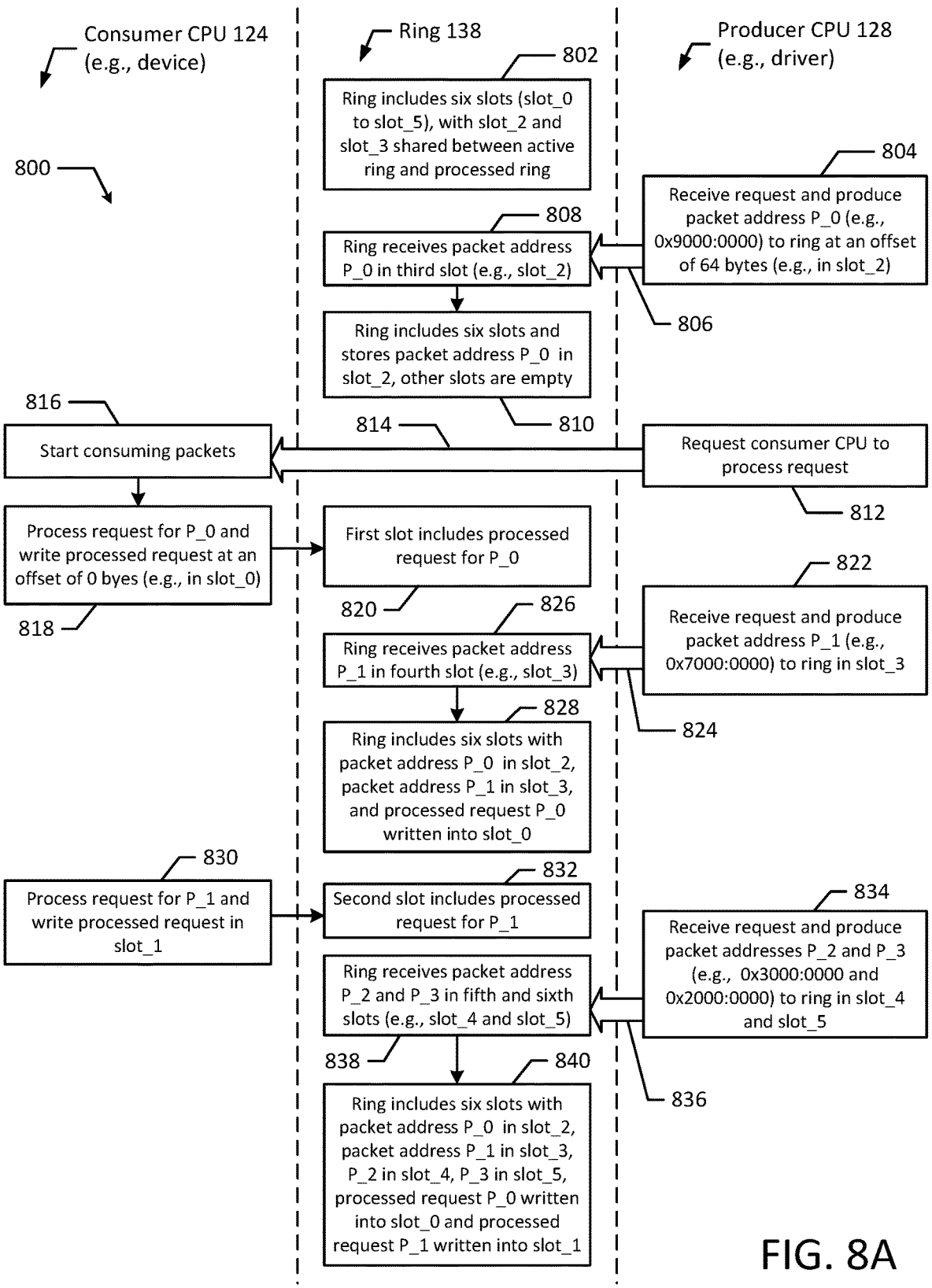
FIGS. 8A and 8B illustrate a flow diagram of an example process for memory cache-line bounce reduction in a shared I/O memory ring according to an example embodiment of the present disclosure.
Figure 8B:
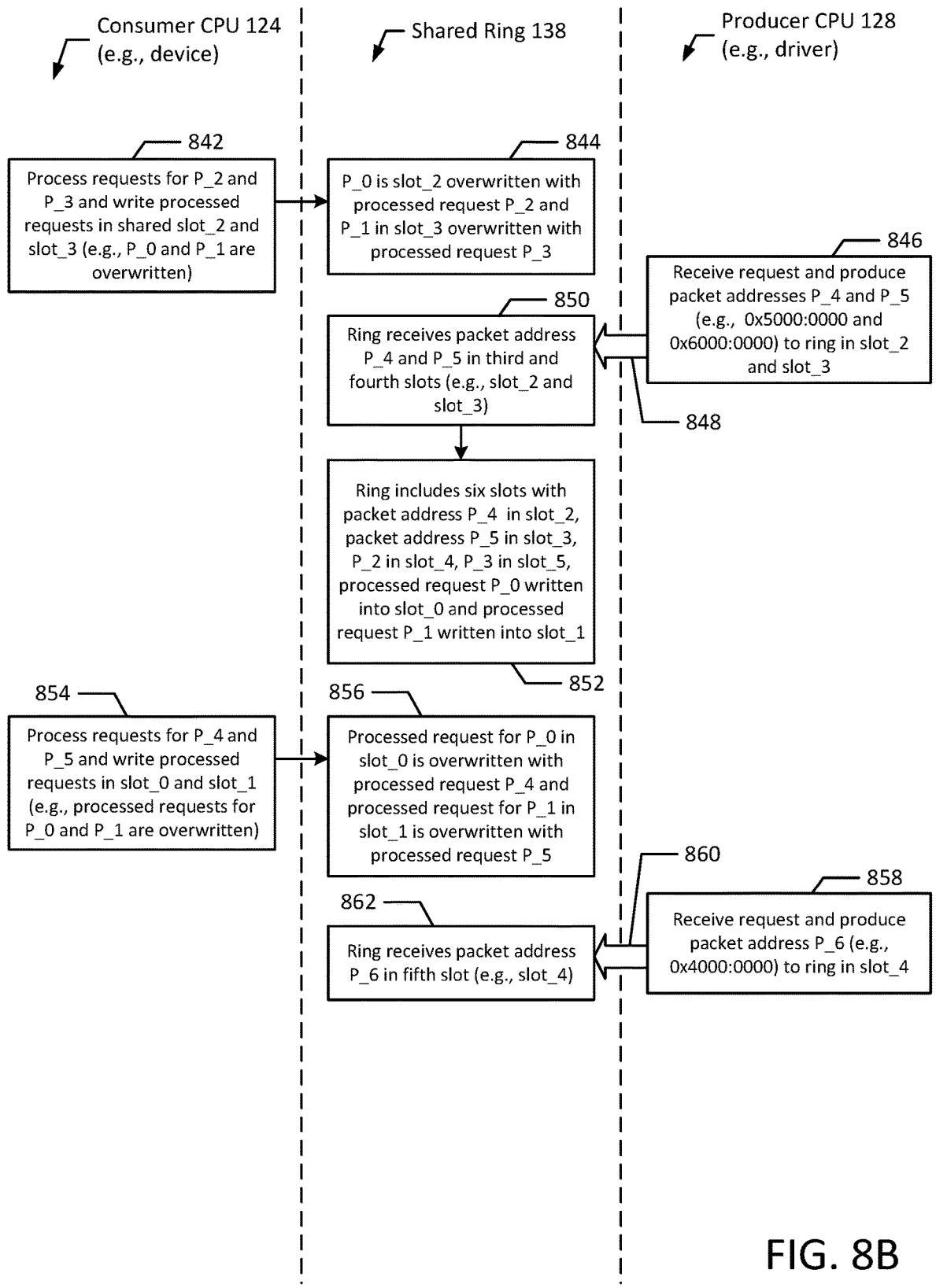

FIGS. 8A and 8B illustrate a flowchart of an example method 800 for memory cache-line bounce reduction in a shared I/O memory ring in accordance with an example of the present disclosure. Although the example method 800 is described with reference to the flowchart illustrated in FIGS. 8A and 8B it will be appreciated that many other methods of performing the acts associated with the method 800 may be used. For example, the order of some of the blocks may be changed, certain blocks may be combined with other blocks, and some of the blocks described are optional. For example, a consumer processor 124 (e.g., consumer CPU) and a producer processor 128 (e.g., producer CPU) may communicate with a shared ring buffer 138 to perform example method 800.

In the illustrated example, the ring 138 includes six slots (e.g., slot_0 to slot_5), where slot_2 and slot_3 are shared between an active ring and a processed ring (block 802). In an example, each slot may occupy a portion of a cache-line. In the illustrated example, the ring 138 may occupy an integer number of cache-lines (e.g., two cache-lines). However, the ring 138 may also occupy a non-integer number cache-lines. The producer CPU 128 receives a packet request and produces packet address P_0 (e.g., 0x9000:00000) to the ring 138 at an offset of 48 bytes (e.g., in slot_2) (blocks 804 and 806). In an example, an empty slot may include a NULL value and the producer CPU 128 may store packet address P_0 in the ring 138 by writing the packet address into the slot (e.g., replacing NULL value with packet address). Then, the ring 138 receives the packet address 'P_0' in the third slot (e.g., slot_2) (block 808). At this point in time, the ring 138, which has six slots, stores packet address 'P_0' in slot_2 while the other slots are empty (block 810). After the producer CPU stores packet address 'P_0' in slot 2, the producer CPU may advance a pointer to slot_3 to indicate the slot that the next packet request will be produced to. For example, the producer CPU 128 may advance the pointer to the slot after the last filled slot (e.g., slot_3 since the producer CPU 128 last filled slot_2), which will indicate to the producer CPU 128 where to start adding new packets in the future. In an example, the producer CPU 128 may wait to advance the pointer to slot_3 until after the slot is consumed (e.g., P_1 is copied and processed by the consumer CPU 124). By maintaining the pointer location, the producer CPU 128 may advantageously store packets or packet addresses in the ring buffer 138 in sequential order, which is advantageous for packet addresses that are received in the batches, such that data is consumed by the consumer CPU 124 sequentially.

Then, the producer CPU 128 may request the consumer CPU to process the request (blocks 812 and 814). After receiving the request, the consumer CPU starts consuming packets (block 816). The consumer CPU processes the request for 'P_0' and writes the processed request at an offset of 0 bytes (e.g., in slot_0) of the ring 138 (block 818). As the consumer CPU 124 consumes and copies packet data for P_0, the consumer CPU 124 may copy the packet data for P_0 to another memory location, such as VM memory 195A. For example, the consumer CPU 124 may retrieve packet address P_0 from slot_0, and then copy the packet associated with packet address P_0 to VM memory 195A. Now, the first slot in the ring 138 includes the processed request for 'P_0' (block 820).

The producer CPU 128 may receive another request and process packet address 'P_1' (e.g., 0x7000:0000) to ring 138 in slot_3(blocks 822 and 824). As mentioned above, slot_3 may be indicated by a pointer or tracked by a counter. Then, the ring 138 receives the packet address 'P_1' in the fourth slot (e.g., slot_3) (block 826). In this example, slot_0 and slot_1 are in non-overlapping region of the producer ring buffer, slot_2 and slot_3 are in the overlapping region and shared between both the producer ring buffer and the active ring buffer, and slot_4 and slot_5 are in the non-overlapping region of the active ring buffer. Additionally, the cache-line boundary may be between slot_2 and slot_3 such that the first three slots occupy a first cache-line and the second three slots occupy a second cache-line. Now, the ring includes six slots with packet address 'P_0' in slot_2, packet address 'P_1' in slot_3, and processed request 'P_0" written into slot_0 (block 828). Since 'P_1' is produced in slot_3, it is in a different cache-line than the processed request 'P_0' written into slot_0. Therefore, the initial offsets chosen of 48 bytes and 0 bytes create a spacing between the slots successively accessed between the consumer CPU 124 and the producer CPU 128 to prevent cache-line bouncing.

After the new request for packet address 'P_1' has been produced to the ring, the consumer CPU 124 processes the request for 'P_1' and writes the processed request in slot_1 (block 830). The second slot of the ring includes processed request for 'P_1' (block 832). Again, the second slot (e.g., slot_1) is in a different cache-line than the slot_3, which was the last slot accessed by the producer CPU 128, so both the consumer CPU 124 and producer CPU 128 are accessing different cache-lines. Allowing both the consumer CPU 124 and the producer CPU 128 to access different cache-lines in parallel improves efficiency while preventing cache-line bounces.

At a later time, the producer CPU 128 may receive a request and produces packet addresses 'P_2' and 'P_3' (e.g., 0x3000:0000 and 0x2000:0000) to the ring 138 in slot_4 and slot_5 respectively (blocks 834 and 836). In an example, the producer CPU 128 may start producing packets (e.g., packet addresses) immediately after receiving a batch of packets. In another example, the producer CPU 128 may start producing packets after a predetermined amount of time or after receiving a request to produce the batch of packets. Then, the ring receives packet addresses 'P_2' and 'P_3' in the fifth and sixth slots (e.g., slot_4 and slot_5) (block 838). The fifth and six slots occupy the second cache-line, which is a different cache-line than the second slot (e.g., slot_1), which was the last slot accessed by the consumer CPU 124. In an example, the producer CPU 128 may produce the packets one-by-one and allow the consumer CPU 124 to consume an entry (e.g., 'P_2') before producing the next entry (e.g., 'P_3'). Now the six slots of the ring 138 include packet address 'P_0' in slot_2, packet address 'P_1' in slot_3, 'P_2' in slot_4, 'P_3' in slot_5, processed request 'P_0' written in slot_0 and processed request 'P_1' written in slot_1 (block 840).

After 'P_2' and 'P_3' have been produced to the ring 139, the consumer CPU 124 processes the requests for 'P_2' and 'P_3' and writes the processed requests in shared slot_2 and slot_3 (e.g., 'P_0' and 'P_1' are overwritten) (block 842).

The entry of 'P_0' in slot_2 is overwritten with processed request 'P_2' and the entry of 'P_1' in slot_2 is overwritten with processed request 'P_3' in the ring 138 (block 844). Similar to the producer CPU 128, the consumer CPU 124 may advance a pointer or use a counter to track the CPU's current position (e.g., slot) or to indicate the next position (e.g., slot). For example, after writing a processed request in shared slot_2, the consumer CPU 124 may advance a pointer to slot_3 to indicate that slot_3 is the next slot that a processed packet will be written to.

At a later time, the producer CPU receives another request and produces packet address 'P_4' and 'P_5' (e.g., 0x5000: 0000 and 0x6000:0000) to the ring 138 in slot_2 and slot_3 respectively (blocks 846 and 848). To start producing packets from the new batch (e.g., 'P_4' and 'P_5'), the producer CPU 128 may identify the slot associated with the pointer used to track produced packet addresses. For example, the producer CPU 128 may identify the slot indicated by the pointer, which is preferably the next available slot after the last produced packet address. The ring 138 receives the packet addresses ('P_4' and 'P_5') in the third and fourth slots (e.g., slot_2 and slot_3) (block 850). In the illustrated example, the producer CPU 128 accesses the second cache-line when producing 'P_5' to the fourth slot (e.g., slot_3). Now the ring's 138 six slots include packet address 'P_4' in slot_2, packet address 'P_5' in slot_3, 'P_2' in slot_4, 'P_3' in slot_5, processed request 'P_0' written into slot_0 and processed request 'P_1' written into slot_1 (block 852).

The consumer CPU 12 may again process the newly produced requests for 'P_4' and 'P_5' and write the processed requests in slot_0 and slot_1 respectively (e.g., by overwriting the processed requests for 'P_0' and 'P_1') (block 854). Both slot_0 and slot_1 are in the first cache-line, which is a different than the second-cache-line the producer CPU 128 is currently accessing. Because the consumer CPU 124 and the producer CPU 128 are in different cache-lines, cache-line bounces are prevented. Then, the processed request for 'P_0' in slot_0 is overwritten with processed request 'P_4' and processed request for 'P_1' in slot_1 is overwritten with processed request for 'P_5' (block 856).

The producer CPU 128 may receive another request and produce packet address 'P_6 (e.g., 0x4000:0000) to the ring 138 in slot_4 (blocks 858 and 860). Then, the ring 138 receives the packet address 'P_6' in the fifth slot (e.g., slot_4) (block 862). In the illustrated example, memory operations can be handled by both the producer CPU 128 and consumer CPU 124 without a cache-line bounce thereby improving performance (e.g., reduce latency and increased throughput). Additionally, the improved performance may be achieved without increasing the ring size by a factor of two, but instead by extending the shared memory region.

Figure 9A:
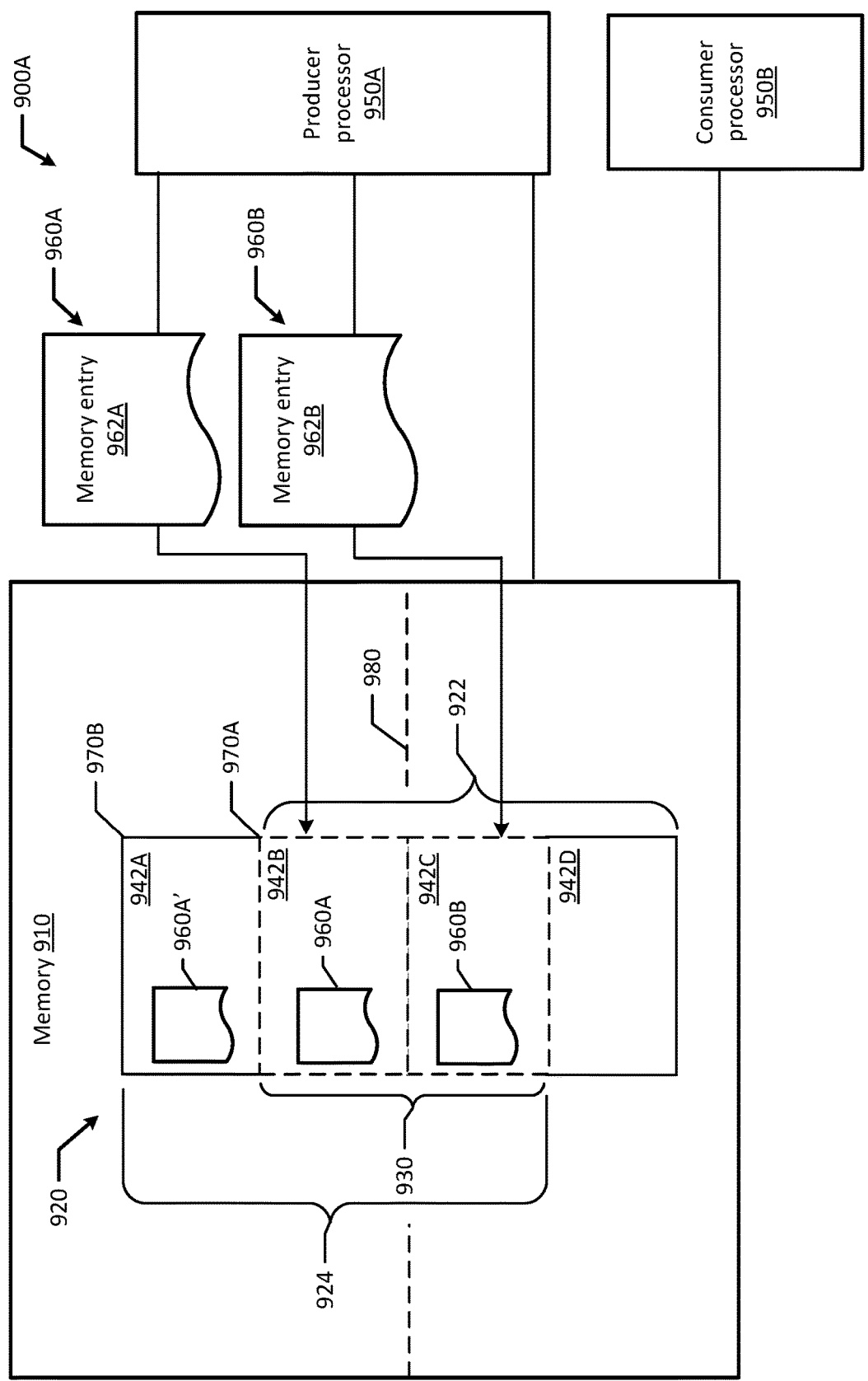
FIG. 9A illustrates a block diagram of an example shared I/O ring structure submission system according to an example embodiment of the present disclosure.

FIG. 9A is a block diagram of an example shared I/O ring structure submission system 900A according to an example of the present disclosure. The reverse order submission system 900A includes a memory 910, which includes a shared ring buffer 920. The shared ring buffer includes an active ring buffer 922 and a processed ring buffer 924 that partially overlap in an overlapping region 930. The active ring buffer 922 has a first plurality of slots 942B-D and the processed ring 924 buffer has a second plurality of slots 942A-C. The system 900A also includes a producer processor 950A and a consumer processor 950B.

The producer processor 950A is in communication with the memory 910 and is configured to receive a first request 960A associated with a first memory entry 962A. The producer processor 950A is also configured to store the first request 960A in a first slot 942B of the shared ring buffer 920 at a first offset 970A. Additionally, the producer processor 950A is configured to, receive a second request 960B associated with a second memory entry 962B and store the second request 960B in a second slot 942C of the shared ring buffer 920. The second slot 942C is located in the overlapping region 930 and adjacent to the first slot 942B. The consumer processor 950B is in communication with the memory 910 and is configured to process the first request 960A and write the processed first request 960A' in a third slot 942A of the shared ring buffer at a second offset 970B. The third slot 942A is located in the processed ring buffer 924 outside of the overlapping region 930, and the third slot 942A is in a different cache-line (e.g. on opposite side of cache-line boundary 980) than the second slot 942C.

Instead of a cache-line constantly bouncing between the producer processor 950A and consumer processor 950B, the overlapping region 930 and non-overlapping regions (e.g., portions of active ring buffer 922 and processed ring buffer 924 outside of the overlapping region 930) along with the offsets 970A-B advantageously maintains a spacing between memory operations between the producer processor 950A and 950B. The offsets 970A-B allow memory operations such as requests 960A-B or their respective memory entries 962A-B to be stored and processed without the cache-line bouncing between the producer processor 950A and the consumer processor 950B, which improves performance (e.g., reduced latency and increased throughput) without substantially increasing the size of the ring buffer 920.

Figure 9B:
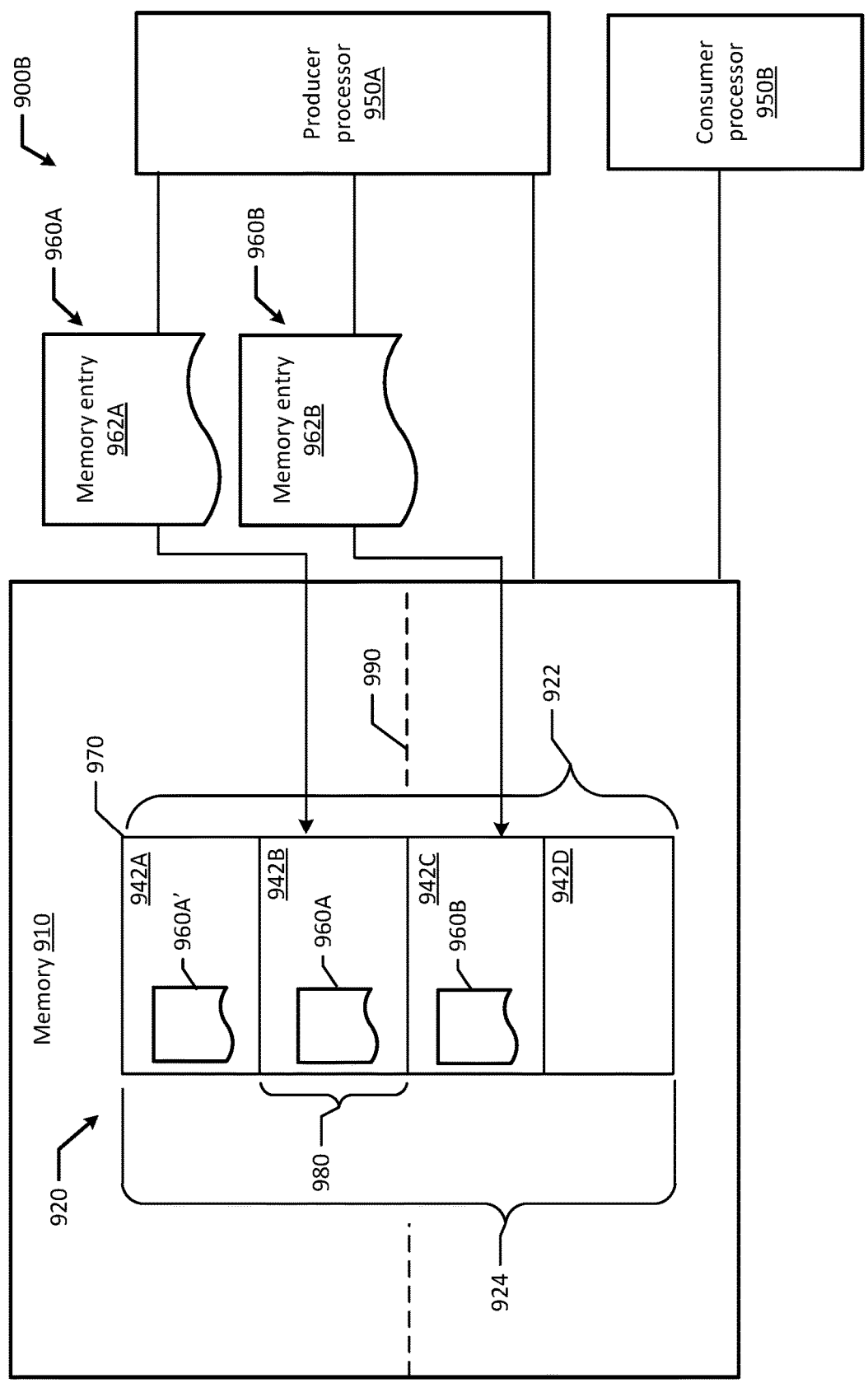
FIG. 9B illustrates a block diagram of an example shared I/O ring structure submission system according to an example embodiment of the present disclosure.

FIG. 9B is a block diagram of another example shared I/O ring structure submission system 900B according to an example of the present disclosure. The reverse order submission system 900B includes a memory 910 including a shared ring buffer 920 having a plurality of slots 942A-D. The system 900B also includes a producer processor 950A and a consumer processor 950B. The shared ring buffer 920 includes an active ring buffer 922 and a processed ring buffer 924 that entirely overlap. The producer processor 950A is in communication with the memory 910 and is configured to receive a first request 960A associated with a first memory entry 962A. The producer processor 950A is also configured to store the first request 960A in a first slot 942B of the shared ring buffer 920. Additionally, the producer processor 950A is configured to receive a second request 960B associated with a second memory entry 962B, and store the second request 960B in a second slot 942C adjacent to the first slot 942B. The consumer processor 950B is in communication with the memory 910 and is configured to process the first request 960A and write the processed first request 960A' in the shared ring buffer 920 in a third slot 942A at an offset 970. The offset 970 and the location of the first slot 942B create a spacing 980 between slots (e.g., slot 942A and 942C) successively accessed by the consumer processor 950B and the producer processor 950A. Additionally, the third slot 942A is in a different cache-line (e.g., on opposite side of cache-line boundary 990) than the second slot 942C.

Instead of a cache-line constantly bouncing between the producer processor 950A and consumer processor 950B, the offset 970 and location of the first slot 942B are chosen to create and maintain a spacing 980. The spacing 980 advantageously allows memory operations such as requests 960A-B or their respective memory entries 962A-B to be stored and processed without the cache-line bouncing between the producer processor 950A and the consumer processor 950B, which improves performance (e.g., reduced latency and increased throughput) without substantially increasing the size of the ring buffer 920.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a memory, which includes a shared ring buffer. The shared ring buffer includes an active ring buffer and a processed ring buffer that partially overlap in an overlapping region. The active ring buffer has a first plurality of slots and the processed ring buffer has a second plurality of slots. The system also includes a producer processor and a consumer processor. The producer processor is in communication with the memory and is configured to receive a first request associated with a first memory entry, store the first request in a first slot of the shared ring buffer at a first offset, receive a second request associated with a second memory entry, and store the second request in a second slot of the shared ring buffer. The second slot is located in the overlapping region and adjacent to the first slot. The consumer processor is in communication with the memory and is configured to process the first request and write the processed first request in a third slot of the shared ring buffer at a second offset. The third slot is located in the processed ring buffer outside of the overlapping region, and the third slot is in a different cache-line than the second slot.

In a 2nd exemplary aspect of the present disclosure, which may be used in combination with any one or more of the preceding aspects (e.g., the 1st aspect), the shared ring buffer includes a starting slot, a set of overlapping slots in the overlapping region, and an end slot.

In a 3rd exemplary aspect of the present disclosure, which may be used in combination with any one or more of the preceding aspects (e.g., the 2nd aspect), the set of overlapping slots includes an initial slot and a final slot.

In a 4th exemplary aspect of the present disclosure, which may be used in combination with any one or more of the preceding aspects (e.g., the 3rd aspect), the initial slot is the first slot and the starting slot is the third slot.

In a 5th exemplary aspect of the present disclosure, which may be used in combination with any one or more of the preceding aspects (e.g., the 1st aspect), the consumer processor and the producer processor are on different cores of the same physical processor.

In a 6th exemplary aspect of the present disclosure, which may be used in combination with any one or more of the preceding aspects (e.g., the 1st aspect), the consumer processor and the producer processor are different physical processors.

In a 7th exemplary aspect of the present disclosure, which may be used in combination with any one or more of the preceding aspects (e.g., the 1st aspect), the shared ring buffer occupies a non-integer number of cache-lines.

In an 8th exemplary aspect of the present disclosure, which may be used in combination with any one or more of the preceding aspects (e.g., the 1st aspect), the shared ring buffer occupies an integer number of cache-lines.

In a 9th exemplary aspect of the present disclosure, which may be used in combination with any one or more of the preceding aspects (e.g., the 1st aspect), the first request is a packet address.

In a 10th exemplary aspect of the present disclosure, which may be used in combination with any one or more of the preceding aspects (e.g., the 1st aspect), the producer processor is configured to maintain a spacing from the consumer processor. Additionally, the spacing includes a set of consecutive slots, which occupies at least one entire cache-line.

In an 11th exemplary aspect of the present disclosure, which may be used in combination with any one or more of the preceding aspects (e.g., the 1st aspect), the consumer processor is configured to maintain a spacing from the producer processor. Additionally, the spacing includes a set of consecutive slots, which occupies at least one entire cache-line.

In a 12th exemplary aspect of the present disclosure, which may be used in combination with any one or more of the preceding aspects (e.g., the 1st aspect), the producer processor is allowed to store a request in the first plurality of slots and is restricted from storing the request in slots of the second plurality of slots outside of the overlapping region.

In a 13th exemplary aspect of the present disclosure, which may be used in combination with any one or more of the preceding aspects (e.g., the 1st aspect), the consumer processor is allowed write a processed request in the second plurality of slots and is restricted from writing the processed request in slots of the first plurality of slots outside of the overlapping region.

Aspects of the subject matter described herein may be useful alone or in combination with one or more other aspects described herein. In a 14th exemplary aspect of the present disclosure, a method includes receiving, by a producer processor, a first request associated with a first memory entry. The method also includes storing, by the producer processor, the first request in a first slot of a shared ring buffer at a first offset. The shared ring buffer includes an active ring buffer and a processed ring buffer that partially overlap in an overlapping region. The active ring buffer has a first plurality of slots and the processed ring buffer has a second plurality of slots. Additionally, the method includes processing, by a consumer processor, the first request and writing, by the consumer processor, the processed first request in a second slot of the shared ring buffer at a second offset. The second slot is located in the processed ring buffer outside of the overlapping region. The producer processor receives a second request associated with a second memory entry and stores the second request in a third slot of the shared ring buffer. The third slot is located in the overlapping region and adjacent to the first slot, and the third slot is in a different cache-line than the second slot.

In a 15th exemplary aspect of the present disclosure, which may be used in combination with any one or more of the preceding aspects (e.g., the 14th aspect), the shared ring buffer includes a starting slot, a set of overlapping slots in the overlapping region, and an end slot. Additionally, the set of overlapping slots includes an initial slot and a final slot.

In a 16th exemplary aspect of the present disclosure, which may be used in combination with any one or more of the preceding aspects (e.g., the 15th aspect), the initial slot is the first slot and the starting slot is the second slot.

In a 17th exemplary aspect of the present disclosure, which may be used in combination with any one or more of the preceding aspects (e.g., the 15th aspect), the shared ring buffer occupies a non-integer number of cache-lines.

In an 18th exemplary aspect of the present disclosure, which may be used in combination with any one or more of the preceding aspects (e.g., the 15th aspect), the shared ring buffer occupies an integer number of cache-lines.

In a 19th exemplary aspect of the present disclosure, which may be used in combination with any one or more of the preceding aspects (e.g., the 14th aspect), the method further includes maintaining, by the producer processor, a spacing from the consumer processor. The spacing includes a set of slots, and the set of slots occupies at least one entire cache-line.

In a 20th exemplary aspect of the present disclosure, which may be used in combination with any one or more of the preceding aspects (e.g., the 14th aspect), the method further includes maintaining, by the consumer processor, a spacing from the producer processor. The spacing includes a set of slots, and the set of slots occupies at least one entire cache-line.

Aspects of the subject matter described herein may be useful alone or in combination with one or more other aspects described herein. In a 21st exemplary aspect of the present disclosure, a non-transitory machine-readable medium stores code, which when executed by a producer processor and a consumer processor, is configured to receive a first request associated with a first memory entry and store the first request in a first slot of a shared ring buffer at a first offset. The shared ring buffer includes an active ring buffer and a processed ring buffer that partially overlap in an overlapping region. Additionally, the active ring buffer has a first plurality of slots and the processed ring buffer has a second plurality of slots. The non-transitory machine-readable medium is further configured to process the first request, and write the processed first request in a second slot of the shared ring buffer at a second offset. The second slot is located in the processed ring buffer outside of the overlapping region. The non-transitory machine-readable medium is also configured to receive a second request associated with a second memory entry, and store the second request in a third slot of the shared ring buffer. The third slot is located in the overlapping region and adjacent to the first slot, and the third slot is in a different cache-line than the second slot.

Aspects of the subject matter described herein may be useful alone or in combination with one or more other aspects described herein. In a 22nd exemplary aspect of the present disclosure, a system includes a first means for receiving a first request associated with a first memory entry, and a first means for storing the first request in a first slot of a shared ring buffer at a first offset. The shared ring buffer includes an active ring buffer and a processed ring buffer that partially overlap in an overlapping region. The active ring buffer has a first plurality of slots and the processed ring buffer has a second plurality of slots. The system also includes a means for processing the first request and a means for writing the processed first request in a second slot of the shared ring buffer at a second offset. The second slot is located in the processed ring buffer outside of the overlapping region. Additionally, the system includes a second means for receiving a second request associated with a second memory entry and a second means for storing the second request in a third slot of the shared ring buffer. The third slot is located in the overlapping region and adjacent to the first slot, and the third slot is in a different cache-line than the second slot.

Aspects of the subject matter described herein may be useful alone or in combination with one or more other aspects described herein. In a 23rd exemplary aspect of the present disclosure, a system includes a memory including a shared ring buffer having a plurality of slots, a producer processor, and a consumer processor. The shared ring buffer includes an active ring buffer and a processed ring buffer that entirely overlap. The producer processor is in communication with the memory and is configured to receive a first request associated with a first memory entry, store the first request in a first slot of the shared ring buffer, receive a second request associated with a second memory entry, and store the second request in a second slot adjacent to the first slot. The consumer processor is in communication with the memory and is configured to process the first request and write the processed first request in the shared ring buffer in a third slot at an offset. The offset and the location of the first slot create a spacing between slots successively accessed by the consumer processor and the producer processor, and the third slot is in a different cache-line than the second slot.

In a 24th exemplary aspect of the present disclosure, which may be used in combination with any one or more of the preceding aspects (e.g., the 23rd aspect), the producer processor is configured to store a request in any of the plurality of slots while maintaining the spacing between slots successively accessed by the consumer processor and the producer processor.

In a 25th exemplary aspect of the present disclosure, which may be used in combination with any one or more of the preceding aspects (e.g., the 23rd aspect), the consumer processor is configured to write a processed request in any of the plurality of slots while maintaining the spacing between slots successively accessed by the consumer processor and the producer processor.

In a 26th exemplary aspect of the present disclosure, which may be used in combination with any one or more of the preceding aspects (e.g., the 23rd aspect), the starting slot is the third slot.

In a 27th exemplary aspect of the present disclosure, which may be used in combination with any one or more of the preceding aspects (e.g., the 23rd aspect), the consumer processor and the producer processor are on different cores of the same physical processor.

In a 28th exemplary aspect of the present disclosure, which may be used in combination with any one or more of the preceding aspects (e.g., the 23rd aspect), the consumer processor and the producer processor are different physical processors.

In a 29th exemplary aspect of the present disclosure, which may be used in combination with any one or more of the preceding aspects (e.g., the 23rd aspect), the shared ring buffer occupies a non-integer number of cache-lines.

In a 30th exemplary aspect of the present disclosure, which may be used in combination with any one or more of the preceding aspects (e.g., the 23rd aspect), the shared ring buffer occupies an integer number of cache-lines.

In a 31st exemplary aspect of the present disclosure, which may be used in combination with any one or more of the preceding aspects (e.g., the 23rd aspect), the first request is a packet address.

In a 32nd exemplary aspect of the present disclosure, which may be used in combination with any one or more of the preceding aspects (e.g., the 23rd aspect), the system further includes a counter that is configured to track a position of a current slot accessed by the consumer processor.

In a 33rd exemplary aspect of the present disclosure, which may be used in combination with any one or more of the preceding aspects (e.g., the 32nd aspect), the consumer processor is configured to wrap around the shared ring buffer to the starting slot when a counter value tracked by the counter exceeds the size of the shared ring buffer.

In a 34th exemplary aspect of the present disclosure, which may be used in combination with any one or more of the preceding aspects (e.g., the 23rd aspect), the system of further includes a counter that is configured to track a position of a current slot accessed by the producer processor.

In a 35th exemplary aspect of the present disclosure, which may be used in combination with any one or more of the preceding aspects (e.g., the 34th aspect), the producer processor is configured to wrap around the shared ring buffer to the starting slot when a counter value tracked by the counter exceeds the size of the shared ring buffer.

In a 36th exemplary aspect of the present disclosure, which may be used in combination with any one or more of the preceding aspects (e.g., the 23rd aspect), the producer processor is configured to maintain the spacing from the consumer processor, and the spacing is at least a set of consecutive slots, which occupies at least one entire cache-line.

In a 37th exemplary aspect of the present disclosure, which may be used in combination with any one or more of the preceding aspects (e.g., the 23rd aspect), the consumer processor is configured to maintain a spacing from the producer processor, wherein the spacing is at least a first set of consecutive slots, wherein the set of consecutive slots occupies at least one entire cache-line.

Aspects of the subject matter described herein may be useful alone or in combination with one or more other aspects described herein. In a 38th exemplary aspect of the present disclosure, a method includes receiving, by a producer processor, a first request associated with a first memory entry. The method also includes storing, by the producer processor, the first request in a first slot in a shared ring buffer. The shared ring buffer includes an active ring buffer and a processed ring buffer that entirely overlap. Additionally, the method includes processing, by a consumer processor, the first request and writing, by the consumer processor, the processed first request in the shared ring buffer in a second slot at an offset. The offset and the location of the first slot create a spacing between slots successively accessed by the consumer processor and the producer processor. The producer processor receives a second request associated with a second memory entry and stores the second request in a third slot of the shared ring buffer adjacent to the first slot. The third slot is in a different cache-line than the second slot.

Aspects of the subject matter described herein may be useful alone or in combination with one or more other aspects described herein. In a 39th exemplary aspect of the present disclosure, a non-transitory machine-readable medium stores code, which when executed by a producer processor and a consumer processor, is configured to receive a first request associated with a first memory entry, store the first request in a first slot in a shared ring buffer, and process the first request. The shared ring buffer includes an active ring buffer and a processed ring buffer that entirely overlap. The non-transitory machine-readable medium is also configured to write the processed first request in the shared ring buffer in a second slot at an offset. The offset and the location of the first slot create a spacing between slots successively accessed by the consumer processor and the producer processor. Additionally, the non-transitory machine-readable medium is configured to receive a second request associated with a second memory entry and store the second request in a third slot of the shared ring buffer adjacent to the first slot. The third slot is in a different cache-line than the second slot.

Aspects of the subject matter described herein may be useful alone or in combination with one or more other aspects described herein. In a 40th exemplary aspect of the present disclosure, a system includes a first means for receiving a first request associated with a first memory entry and a first means for storing the first request in a first slot in a shared ring buffer. The shared ring buffer includes an active ring buffer and a processed ring buffer that entirely overlap. The system also includes a means for processing the first request and a means for writing the processed first request in the shared ring buffer in a second slot at an offset. The offset and the location of the first slot create a spacing between slots successively accessed by the consumer processor and the producer processor. Additionally, the system includes a second means for receiving a second request associated with a second memory entry and a second means for storing the second request in a third slot of the shared ring buffer adjacent to the first slot. The third slot is in a different cache-line than the second slot.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory including a shared ring buffer, wherein the shared ring buffer includes an active ring buffer and a processed ring buffer that partially overlap in an overlapping region, the active ring buffer having a first plurality of slots and the processed ring buffer having a second plurality of slots;
a producer processor configured to:
receive a first request associated with a first memory entry,
store the first request in a first slot of the shared ring buffer at a first offset such that the first request is stored in the overlapping region,
receive a second request associated with a second memory entry,
store the second request in a second slot of the shared ring buffer such that the second request is stored in the overlapping region, wherein the second slot is located in the overlapping region and adjacent to the first slot; and
a consumer processor configured to:
process the first request and write the processed first request in a third slot of the shared ring buffer at a second offset such that the processed first request is written to the third slot and stored outside of the overlapping region,
thereby creating a spacing between respective slots successively accessed by the producer processor and the consumer processor,
wherein the third slot is located in the processed ring buffer outside of the overlapping region, and the third slot is in a different cache-line than the second slot based on the spacing created by the consumer processor.

2. The system of claim 1, wherein the shared ring buffer includes a starting slot, a set of overlapping slots in the overlapping region, and an end slot.

3. The system of claim 2, wherein the set of overlapping slots includes an initial slot and a final slot.

4. The system of claim 3, wherein the initial slot is the first slot and the starting slot is the third slot.

5. The system of claim 1, wherein the consumer processor and the producer processor are on different cores of the same physical processor.

6. The system of claim 1, wherein the consumer processor and the producer processor are different physical processors.

7. The system of claim 1, wherein the shared ring buffer occupies a non-integer number of cache-lines.

8. The system of claim 1, wherein the shared ring buffer occupies an integer number of cache-lines.

9. The system of claim 1, wherein the first request is a packet address.

10. The system of claim 1, wherein the producer processor is configured to maintain the spacing from the consumer processor, wherein the spacing includes a set of consecutive slots, wherein the set of consecutive slots occupies at least one entire cache-line.

11. The system of claim 1, wherein the consumer processor is configured to maintain the spacing from the producer processor, wherein the spacing includes a set of consecutive slots, wherein the set of consecutive slots occupies at least one entire cache-line.

12. The system of claim 1, wherein the producer processor is allowed to store a request in the first plurality of slots and is restricted from storing the request in slots of the second plurality of slots outside of the overlapping region.

13. The system of claim 1, wherein the consumer processor is allowed write a processed request in the second plurality of slots and is restricted from writing the processed request in slots of the first plurality of slots outside of the overlapping region.

14. A method comprising:
receiving, by a producer processor, a first request associated with a first memory entry;
storing, by the producer processor, the first request in a first slot of a shared ring buffer at a first offset such that the first request is stored in the overlapping region, wherein the shared ring buffer includes an active ring buffer and a processed ring buffer that partially overlap in an overlapping region, the active ring buffer having a first plurality of slots and the processed ring buffer having a second plurality of slots;
processing, by a consumer processor, the first request;
writing, by the consumer processor, the processed first request in a second slot of the shared ring buffer at a second offset such that the processed first request is written to the second slot and stored outside of the overlapping region, thereby creating a spacing between respective slots successively accessed by the producer processor and the consumer processor, wherein the second slot is located in the processed ring buffer outside of the overlapping region;

receiving, by the producer processor, a second request associated with a second memory entry; and
storing, by the producer processor, the second request in a third slot of the shared ring buffer such that the second request is stored in the overlapping region, wherein the third slot is located in the overlapping region and adjacent to the first slot, and the third slot is in a different cache-line than the second slot based on the spacing created by the consumer processor.

15. The method of claim 14, further comprising:
maintaining, by the producer processor, the spacing from the consumer processor, wherein the spacing includes a set of slots, wherein the set of slots occupies at least one entire cache-line.

16. The method of claim 14, further comprising:
maintaining, by the consumer processor, the spacing from the producer processor, wherein the spacing includes a set of slots, wherein the set of slots occupies at least one entire cache-line.

17. A system comprising:
a memory including a shared ring buffer having a plurality of slots, wherein the shared ring buffer includes an active ring buffer and a processed ring buffer that entirely overlap;
a producer processor configured to:
receive a first request associated with a first memory entry,
store the first request in a first slot of the shared ring buffer,
receive a second request associated with a second memory entry,
store the second request in a second slot adjacent to the first slot; and
a consumer processor configured to:
process the first request and write the processed first request in the shared ring buffer in a third slot at an offset, thereby creating a spacing between respective slots successively accessed by the producer processor and the consumer processor,
wherein the offset and the location of the first slot create the spacing between slots successively accessed by the consumer processor and the producer processor to ensure that successively accessed slots are in a different respective cache-lines, and
wherein the third slot is in a different cache-line than the second slot.

18. The system of claim 17, further comprising a counter that is configured to track a position of a current slot accessed by the consumer processor.

19. The system of claim 18, wherein the consumer processor is configured to wrap around the shared ring buffer to the starting slot when a counter value tracked by the counter exceeds the size of the shared ring buffer.

20. The system of claim 17, further comprising a counter that is configured to track a position of a current slot accessed by the producer processor, and the producer processor is configured to wrap around the shared ring buffer to the starting slot when a counter value tracked by the counter exceeds the size of the shared ring buffer.

* * * * *